United States Patent
Stimits

(10) Patent No.: US 8,318,340 B2
(45) Date of Patent: Nov. 27, 2012

(54) ALKALINE ELECTROCHEMICAL CELL WITH REDUCED GASSING

(75) Inventor: Jason L. Stimits, Avon, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 13/288,102

(22) Filed: Nov. 3, 2011

(65) Prior Publication Data

US 2012/0052413 A1    Mar. 1, 2012

Related U.S. Application Data

(60) Division of application No. 12/109,419, filed on Apr. 25, 2008, which is a continuation-in-part of application No. 11/933,552, filed on Nov. 1, 2007, now Pat. No. 7,993,508.

(60) Provisional application No. 60/855,876, filed on Nov. 1, 2006.

(51) Int. Cl.
*H01M 6/08*    (2006.01)
*H01M 4/54*    (2006.01)
*H01M 4/50*    (2010.01)
*H01M 4/42*    (2006.01)

(52) U.S. Cl. ......... 429/164; 429/219; 429/224; 429/229

(58) Field of Classification Search ................... 429/133, 429/164, 168, 229, 224, 219
See application file for complete search history.

(56) References Cited

U.S. PATENT DOCUMENTS

| | | | |
|---|---|---|---|
| 2,495,247 A | 1/1950 | Friedman | |
| 2,542,575 A | 2/1951 | Ruben | |
| 2,542,710 A | 2/1951 | Ruben | |
| 2,576,266 A | 11/1951 | Ruben | |
| 3,657,018 A | 4/1972 | Ruetschi | |
| 3,897,265 A | 7/1975 | Auborn | |
| 4,041,211 A | 8/1977 | Wiacek | |
| 4,364,800 A | 12/1982 | Partridge | |
| 4,405,698 A | 9/1983 | Nagaura | |
| 4,652,348 A | 3/1987 | Yahalom et al. | |

(Continued)

FOREIGN PATENT DOCUMENTS

EP    0789407    8/1997

(Continued)

OTHER PUBLICATIONS

Clad Metal Specialties Inc., Bayshore, NY. Clad Metal Products. Retrieved from the Internet. <http://cladmetal.com/products.htm>.

(Continued)

*Primary Examiner* — Ula C. Ruddock
*Assistant Examiner* — Thomas H. Parsons
(74) *Attorney, Agent, or Firm* — Russell H. Toye, Jr.

(57) ABSTRACT

Electrochemical cells including a casing or cup for direct electrical contact with a negative electrode or counter electrode and serving as the current collector for the electrode. The casing includes a substrate having a plated coating of an alloy including copper, tin and zinc, the coating having a composition gradient between the substrate and the external surface of the coating wherein the copper content is greater adjacent the substrate than at the external surface of the coating and the tin content is greater at the external surface of the coating than adjacent the substrate. Methods for forming a coated casing and an electrochemical cell including a coated casing are disclosed, preferably including providing an electrode casing with a coating utilizing variable current density plating that reduces discoloration of a surface exposed to the ambient atmosphere.

20 Claims, 3 Drawing Sheets

U.S. PATENT DOCUMENTS

| | | | |
|---|---|---|---|
| 4,791,036 | A | 12/1988 | Schrenk et al. |
| 4,869,971 | A | 9/1989 | Nee et al. |
| 4,992,343 | A | 2/1991 | Nardi |
| 5,188,869 | A | 2/1993 | Getz et al. |
| 5,242,565 | A | 9/1993 | Winsel |
| 5,279,905 | A | 1/1994 | Mansfield, Jr. et al. |
| 5,281,497 | A | 1/1994 | Kordesch et al. |
| 5,397,658 | A | 3/1995 | Dunham |
| 5,445,908 | A | 8/1995 | Inoue et al. |
| 5,567,538 | A | 10/1996 | Oltman et al. |
| 5,707,499 | A | 1/1998 | Joshi et al. |
| 5,993,994 | A | 11/1999 | Ohmura et al. |
| 6,048,646 | A | 4/2000 | Xing et al. |
| 6,060,196 | A | 5/2000 | Gordon et al. |
| 6,193,858 | B1 | 2/2001 | Hradil et al. |
| 6,197,445 | B1 | 3/2001 | Ward et al. |
| 6,312,834 | B1 | 11/2001 | Ishio et al. |
| 6,322,686 | B1 | 11/2001 | Brown et al. |
| 6,372,381 | B1 | 4/2002 | Park et al. |
| 6,447,947 | B1 | 9/2002 | Huq et al. |
| 6,551,742 | B1 | 4/2003 | Huq et al. |
| 6,602,629 | B1 | 8/2003 | Guo et al. |
| 6,723,469 | B1 | 4/2004 | Watanabe et al. |
| 6,759,166 | B2 | 7/2004 | Wang et al. |
| 6,794,082 | B2 | 9/2004 | Mori et al. |
| 6,830,847 | B2 | 12/2004 | Ramaswami et al. |
| 6,852,445 | B1 | 2/2005 | Schmidt et al. |
| 7,993,508 | B2 | 8/2011 | Stimits et al. |
| 2002/0150814 | A1 | 10/2002 | Causton et al. |
| 2003/0082456 | A1 | 5/2003 | Ho |
| 2003/0211387 | A1 | 11/2003 | Braunger et al. |
| 2004/0221446 | A1 | 11/2004 | Ohhara et al. |
| 2006/0115724 | A1 | 6/2006 | Buckle et al. |
| 2006/0246353 | A1 | 11/2006 | Guo et al. |
| 2007/0283558 | A1 | 12/2007 | Keiemen et al. |

FOREIGN PATENT DOCUMENTS

| | | |
|---|---|---|
| JP | 52-61733 | 5/1977 |
| JP | 56-132766 | 10/1981 |
| JP | 58-051473 | 3/1983 |
| JP | 58-112254 A | 7/1983 |
| JP | 60-183776 | 9/1985 |
| JP | 61-061364 | 3/1986 |
| JP | 64-059769 | 3/1989 |
| JP | 06-290784 | 10/1994 |
| JP | 7-302581 | 11/1995 |
| JP | 07-326358 | 12/1995 |
| JP | 8-222194 | 8/1996 |
| JP | 09-055193 | 2/1997 |
| JP | 09-055194 | 2/1997 |
| JP | 09-147816 | 6/1997 |
| JP | 09-161740 | 6/1997 |
| JP | 10-050318 | 2/1998 |
| JP | 11-354085 A | 12/1999 |
| JP | 2007-080614 A | 3/2007 |
| WO | 2006031367 A2 | 3/2006 |
| WO | 2006118791 A | 11/2006 |

OTHER PUBLICATIONS

Hull, M.N. and James, H.I., "Why Alkaline Cells Leak," J. Electrochem. Soc.: Electrochemical Science & Technology, Mar. 1977, vol. 124, No. 3, pp. 332-339.

Davis, S.M. and Hull, M.N., "Aspects of Alkaline Cell Leakage", J. Electrochem. Soc: Electrochemical Science & Technology, Dec. 1978, vol. 125, No. 12, pp. 1918-1923.

Baugh, L.M., Cook, J.A., Lee, J.A., "A Mechanism for Alkaline Cell Leakage", Journal of Applied Electrochemistry 8 (1978), pp. 253-263.

Nientiedt, H.W., "Electrolyte Creepage in Galvanic Cells, I. Contribution to the Phenomena", Journal of Power Sources, 8 (Sep. 1982), pp. 257-265.

Nientiedt, H.W. and Laig-Horsterbrock, H. Electrolyte Creepage in Galvanic Cells, II. Transport Mechanism at High Pressures, Journal of Power Sources, 8 (Sep. 1982), pp. 267-272.

F.A. Lowenheim, Electroplating, McGraw-Hill Book Company, New York, 1978, pp. 12-19.

Patent Cooperation Treaty (PCT), International Search Report and Written Opinion for Application No. PCT/US2007/023107, filed Nov. 1, 2007, mailed Sep. 2, 2008, European Patent Office, Netherlands.

Electro-Spec, Inc. Tri-M3, A Superior Quality Finish for RF Connectors and Microwave Components, Date Sheet [online, retrieved Jul. 17, 2007], 4 pages, Retrieved from the Internet http://www.electro-spec.com/electrospec/assets/pdf/electro-spec_trim3_datasheet.pdf.

ALKALINE ELECTROCHEMICAL CELL WITH REDUCED GASSING

CROSS REFERENCE TO RELATED APPLICATIONS

This application is a divisional application of U.S. Nonprovisional application Ser. No. 12/109,419, filed Apr. 25, 2008, which is a continuation-in-part of U.S. Nonprovisional application Ser. No. 11/933,552, filed Nov. 1, 2007 (now U.S. Pat. No. 7,993,508) which claims the benefit of U.S. Provisional Application No. 60/855,876, filed Nov. 1, 2006, both fully incorporated herein by reference.

BACKGROUND

This invention relates to electrochemical cells with aqueous alkaline electrolytes and a negative electrode or counter electrode in contact with a cell casing or cup. Electrochemical cells can be used as batteries to provide energy to operate electronic devices. Electrochemical cells, particularly prismatic cells and button cells, are suitable for applications including hearing aids, sensors, computers, calculators, watches and other devices.

Embodiments include zinc/metal oxide cells, with positive electrodes containing one or more metal oxides such as silver oxide, manganese dioxide, nickel oxyhydroxide, silver copper oxide and silver nickel oxide. Other embodiments include cells with catalytic electrodes, such as electrodes that reduce oxygen or generate oxygen or hydrogen, such as fuel cells, metal-air cells, oxygen generating cells and hydrogen generating cells. The invention also relates to methods for forming an electrochemical cell, preferably including providing an electrode casing with a coating that reduces discoloration of a surface exposed to the ambient atmosphere.

Other embodiments of electrochemical cells include alkaline cells having a metal, such as zinc, as an active negative electrode material and a positive electrode including a metal oxide or metal dioxide such as silver oxide and manganese dioxide. Cells containing a metal oxide and/or metal dioxide are usually noted for good voltage stability during discharge. Zinc/metal oxide and zinc/metal dioxide cells typically include an alkaline electrolyte and an electrolyte permeable separator film located between the negative electrode and the positive electrode. Examples of such cells are described in U.S. Pat. Nos. 4,405,698, 6,794,092, 6,759,166, and 6,723,469, as well as U.S. patent application Ser. No. 11/731,361 filed Mar. 30, 2007, all fully incorporated herein by reference.

Some electrochemical cells can be used to generate gases, such as oxygen and hydrogen. One type of electrochemical battery cell has a metal, such as zinc, as an active negative electrode material within the cell and uses a gas from outside the cell, such as oxygen contained in the air, as an active positive electrode material. An example of such a cell is an alkaline electrolyte zinc/air cell. When an external electrical circuit is completed, oxygen in air that enters the cell is reduced at the catalytic positive electrode to produce hydroxyl ions. The hydroxyl ions migrate to the negative electrode where they oxidize the zinc, producing electrons that flow through the external circuit. An example of an alkaline zinc/air cell button cell is disclosed in U.S. Pat. No. 6,602,629, which is hereby incorporated by reference. Electrochemical cells similar in design to an alkaline zinc/air cell can also be used to produce oxygen or hydrogen. In an oxygen generating cell, the catalytic electrode is the oxygen generating electrode, and the counter electrode is a metal oxide (e.g., manganese dioxide, silver oxide, mercuric oxide or nickel oxyhydroxide) rather than zinc. When an electric current is forced to flow through the cell, the metal oxide is reduced to a lower oxidation state, and oxygen is evolved at the oxygen generating electrode. Such a cell is described in U.S. Pat. No. 5,242,565, which is hereby incorporated by reference. In a hydrogen generating cell, the catalytic electrode is the hydrogen generating electrode; the active material of the counter electrode can be a metal such as zinc. When oxygen is excluded from the cell and the cell is short circuited, hydrogen is produced. Examples of hydrogen generating electrochemical cells are disclosed in U.S. Pat. Nos. 5,242,565, 5,707,499 and 6,060,196, all of which are hereby incorporated by reference.

The generation of hydrogen within alkaline electrochemical cells during periods of storage and non-use can be detrimental, particularly for cells in which a portion of the cell housing serves as a current collector. Mercury can be added to these cells to reduce such undesirable hydrogen gassing; however, the addition of mercury is undesirable for health and environmental reasons. Efforts have been made to eliminate mercury, but the cells are still more susceptible to gassing without added mercury.

Electrochemical cells, particularly prismatic cells and button cells, can comprise two electrodes, each in contact with an electrode casing that can serve as a current collector therefore. Depending on the cell construction, a casing can be referred to as a negative electrode casing, a positive electrode casing, a catalytic electrode casing or a counter electrode casing. Such casings can have similarly shaped bodies such as a cup or a pan, each with a closed end and an open end generally opposite the closed end. Of course, metal-air, fuel and gas generating cells typically include one or more orifices in the catalytic electrode casing to allow ingress or egress of gases such as oxygen, carbon dioxide and hydrogen. Prismatic cells and button cells can be sold as single cell batteries not having any jackets or labels covering the external surfaces of the cells. Accordingly, any portion of the cell's internal components, such as liquid electrolyte or salt, that contact the external surfaces of the cells, such as through leakage, is present on an external surface of the one or more cell casings. The presence of leaked components on the external cell surfaces can lead to corrosion thereof. In some instances, the ambient atmosphere can also lead to discoloration of the external cell surfaces. It is also desirable to maintain good electrical contacts in other single cell batteries as well as cells used in multiple cell batteries.

Various attempts have been made to minimize discoloration of external surfaces of electrochemical cells and to improve the leakage resistance of cells which can affect tarnishing of the cells external surfaces. For example, clad metals, such as triclad nickel/stainless steel/copper (Ni/SS/Cu), have been utilized as negative electrode casings for button cells including zinc/silver oxide, zinc/manganese dioxide, zinc/nickel oxyhydroxide and metal-air cells. The nickel plated outer layer is believed to provide an attractive appearance while resisting discoloration. The stainless steel provides strength and the copper inner layer has desirable electrical conductivity, and provides a continuous coating over the stainless steel that can be formed into a desired shape without cracking to expose the stainless steel layer therebeneath. The copper layer is also readily plated with zinc when contacted by a negative electrode containing an alkaline electrolyte and zinc as an active material.

U.S. Pat. No. 6,830,847 relates to a zinc/air button cell comprising a cathode casing and an anode casing wherein the anode casing is inserted into the cathode casing. The anode casing is formed of multi-clad metal layers, for example nickel/stainless steel/copper. A reportedly protective metal is plated on the exposed peripheral edge of the anode casing. The protective metal is desirably selected from copper, tin, indium, silver, brass, bronze or gold. The application of protective metal covers the multi-clad metals exposed along the peripheral edge surface. The protective metal is also desirably plated onto the portion of the outside surface of the anode casing abutting the insulating material placed between the anode and cathode casing. Application of the protective metal to the anode casing peripheral edge reportedly eliminates the potential gradients caused by exposure of the different metals comprising the multi-clad material. This reportedly reduces the chance of electrolyte leakage which can be promoted by secondary reactions occurring along the anode casing peripheral edge.

U.S. Patent Application Publication No. 2003/0211387 relates to a galvanic element with an alkaline electrolyte and a zinc negative electrode, in a housing in the form of a button cell, where at least the outer surface of the cell's cap is coated with a Cu—Sn-alloy containing no nickel or with a Cu—Sn—Zn-alloy containing no nickel. The alloy contains about 20% to about 90% Cu, preferably about 50% to about 60% Cu, with the remainder being Sn, or about 50% to about 60% Cu and about 25% to about 35% Sn, with the remainder being Zn.

U.S. Patent Application Publication No. 2006/0246353 relates to an electrochemical cell with a zinc-containing negative electrode, an aqueous alkaline electrolyte and a cup-shaped metal negative electrode casing in contact with the negative electrode. The negative electrode casing is formed from a substrate that is substantially free of copper and at least those portions of the surface of the negative electrode casing in the seal area and the current collector area are coated with a layer of an alloy comprising copper, tin and zinc. The alloy layer reduces hydrogen gassing within the cell and is particularly useful in cells with no added mercury. Embodiments of the invention include cells with prismatic, cylindrical and button shaped containers and cells with positive electrode active materials including manganese dioxide, silver oxide and oxygen.

U.S. Patent Application Publication No. 2007/0283558 relates to an anode casing having a bright tin or bright tin alloy surface layer at least on an inside surface of the casing, preferably on the entire surface of the anode casing, and to an electrochemical cell containing the anode casing. Methods for preparing anode casings and electrochemical cells containing the anode casings are disclosed. In a preferred embodiment, the anode casings are plated at high current density utilizing a variable contact rack plating process, wherein portions of a clamp assembly of the device variably or alternately contact different portions of the anode casing so the entire surface of the anode casing is plated. The bright tin-plated surface is a high hydrogen-overvoltage metal that reduces gassing in cells using the casings.

Taking the above approaches into consideration, there is still a need for electrochemical cells having constructions which provide leakage resistance and include a negative electrode or counter electrode casing that serves as a current collector, and further resist discoloration, thereby contributing to a desirable aesthetic appearance of the electrochemical cells. It is also desirable for the cells to have excellent shelf life, electrical characteristics and discharge capacity.

In view of the above, an object of the present invention is to provide electrochemical cells that contain no added mercury and are less susceptible to hydrogen gassing during storage and periods of non-use than cells according to the prior art.

Another object of the invention is to provide an electrochemical cell with an electrode containing a metal such as zinc as an active material, and an aqueous alkaline electrolyte that contains no added mercury and produces little hydrogen gas during storage and periods of non-use.

Yet another object of the invention is to provide a method of making an electrochemical cell with an electrode containing a metal such as zinc as an active material, and an aqueous alkaline electrolyte that contains no added mercury and produces little hydrogen gas during storage and periods of non-use.

A further object of the invention is to provide an electrochemical cell with no added mercury and a method of making the cell, the cell having an aqueous alkaline electrolyte and a housing with a negative casing in contact with a negative electrode in which the cell is economical to produce, exhibits a low level of hydrogen gassing during storage and use, and has an attractive external appearance.

Still another object of the invention is to provide a casing for an electrochemical cell, particularly a counter electrode or negative electrode casing, having a coating including an external layer comprising copper, tin and zinc at least on the outer surface of the casing that is exposed to the ambient environment that provides the casing with resistance to discoloration.

Yet another object of the present invention is to provide a casing for an electrochemical cell, particularly a counter electrode or negative electrode casing, formed of a substrate including a copper interior layer and a copper exterior layer, including an external layer comprising copper, tin and zinc at least on the exterior surface of the casing substrate that provides the casing with resistance to discoloration.

Another object of the present invention is to provide an electrochemical cell with a negative electrode or counter electrode casing having a coating of two or more layers on a substrate including a copper inner layer, with the coating comprising a first layer having a greater weight percentage of copper than a second layer and the second layer having a greater weight percentage of tin than the first layer, wherein the cell has no added mercury, with the exposed external surface of the coating casing having a bright finish resistant to discoloration.

A further object of the present invention is to provide a metal casing for a negative electrode, wherein the casing substrate is free of nickel on a surface thereof, thereby preventing nickel contamination of a plating bath, particularly a plating bath comprising copper, tin and zinc.

Still another object of the present invention is to provide a metal casing which serves as the current collector for a negative electrode or counter electrode that is post-plated with at least a first layer and a second layer on at least an exposed portion of an exterior surface of the casing wherein the first layer has a higher copper content than the second layer, and the second layer has a higher tin content than the first layer.

Yet another object of the present invention is to provide a method of making an electrochemical cell with a negative electrode or counter electrode casing comprising a plated coating having variable tin content and copper content in different layers or depths of the coating that are derived from utilizing a variable current density during plating.

A further object of the present invention is to provide a method for forming a coated casing for an electrochemical cell including utilizing multiple current densities to provide various coated layers on the casing.

Still another object of the present invention is to provide a method for forming a plated casing for an electrochemical cell, wherein prior to plating a casing substrate is provided that is free of an exposed nickel layer and has a copper interior surface and a copper exterior surface, and wherein the casing is plated with a plating solution comprising copper, tin and zinc, preferably plated at two different current densities.

SUMMARY

The above objects are met and the above disadvantages of the prior art are overcome by an alkaline electrochemical cell with two electrodes, one of which is disposed in and in direct contact with one part of the metal housing, which serves as the current collector for that electrode and is made from a material, in one embodiment a copper clad material, that is coated with an alloy comprising copper, tin and zinc. In a preferred embodiment, the copper cladding is present on both the exterior and interior surfaces of the housing substrate, prior to coating or plating. The coating has a composition gradient between the clad material and the external surface of the coating. In some embodiments the copper content is greater adjacent to the clad material substrate (i.e., at the internal surface of the coating) than at the external surface of the coating. In some embodiments the tin content is greater at the external surface of the coating than at the internal surface of the coating. The composition gradient can be a uniform or non-uniform gradient. In an embodiment with a non-uniform gradient, the coating can comprise multiple layers, each having a different average composition. The coating can be deposited on a surface of the substrate, such as the interior surface or the exterior surface, or both the interior surface and exterior surface of the substrate using an electrolytic plating process, and the composition gradient can be produced by varying the plating current during the plating process. In a further embodiment, the substrate interior surface and the exterior surface are both essentially free of nickel, thereby eliminating the concern of nickel contamination of a plating or coating solution that is contacted with the substrate. Another benefit of eliminating any nickel from the bath is it prevents nickel from being electrolytically deposited onto the substrate surface as part of the plated layer.

In one aspect of the invention, an electrochemical cell is disclosed, comprising a first and a second electrode, a separator disposed between the first electrode and the second electrode, an aqueous alkaline electrolyte and a cell housing comprising a first electrode housing and a second electrode housing and an electrically insulating seal member disposed between the first electrode housing and second electrode housing, the cell housing containing the first electrode, second electrode, separator and electrolyte, wherein the first electrode housing is in contact with the first electrode and has an interior surface and an exterior surface and comprises a substrate plated with an alloy layer, wherein the alloy layer comprises copper, tin and zinc, and wherein the substrate is a copper-stainless steel-copper triclad substrate.

In another aspect of the invention, an electrochemical cell is disclosed, comprising a first and a second electrode, a separator disposed between the first electrode and the second electrode, an aqueous alkaline electrolyte, and a cell housing comprising a first electrode housing and a second electrode housing and an electrically insulating seal member disposed between the first electrode housing and second electrode housing, the cell housing containing the first electrode, second electrode, separator and electrolyte, wherein the first electrode housing is in contact with the first electrode and has an interior surface and an exterior surface and comprises a substrate plated with an alloy layer, wherein the alloy layer comprises copper, tin and zinc, and wherein the substrate is a clad material including a copper layer clad to each side of a layer of metal.

In yet another aspect of the invention, a method for forming a plated housing for an electrochemical cell is disclosed, comprising the steps of providing an electrode housing comprising a metal substrate having a copper interior surface layer and a copper exterior surface layer with a metal layer disposed between the interior surface layer and the exterior surface layer, and plating a metal alloy layer on the substrate with a plating solution comprising copper, tin and zinc with a combination of two different current densities.

These and other features, advantages and objects of the present invention will be further understood and appreciated by those skilled in the art by reference to the following specification, claims and appended drawings.

Unless otherwise specified, the following definitions and methods are used herein:

Essentially free of nickel means having no nickel included or added, e.g., as a component metal in an alloy, as a layer, or as a coating. A very small amount of nickel (e.g., no more than about 5 parts per million per total parts of an individual metal component such as an alloy, layer, or a coating) may be present as an impurity.

A cell containing no added mercury is one in which mercury is not intentionally added to the cell or any cell component, and any mercury present in the cell is found only in very small amounts, typically less than 50 parts per million by weight, desirably less than 10 parts per million, preferably less than 5 parts per million, and more preferably less than 2 parts per million, as an impurity or contaminant. U.S. Pat. No. 6,602,629 to Guo et al., herein incorporated by reference, discloses the method used to determine the total level of mercury in a cell.

For all test methods utilized herein, one or more alternate test methods can be utilized if the values obtained by the alternate methods are consistent with the values obtained by the disclosed methods, and thus lie within the given range of values for the disclosed test methods.

Unless otherwise specified herein, all disclosed characteristics and ranges are as determined at room temperature (20-25° C.).

BRIEF DESCRIPTION OF THE DRAWINGS

The invention will be better understood and other features and advantages will become apparent by reading the detailed description of the invention, taken together with the drawings, wherein.

DESCRIPTION

Electrochemical cells of the present invention can include button-type cells, prismatic cells, and cylindrical-type cells, wherein a negative electrode, anode or counter electrode casing is in contact with the negative electrode, anode or counter electrode, and thereby functions as the respective electrode current collector. A button cell is a small round cell having an overall height that is less than its diameter. A cylindrical cell is a round cell having a straight cylindrical body and an overall height that is greater than its diameter. A prismatic cell is a non-round cell having a generally prismatic cross section, for example triangular, rectangular, trapezoidal, hexagonal; examples of which include flat, rectangular and square cells. The cell can utilize any electrochemical system for which it is desirable to plate the negative electrode or counter electrode with a layer comprising copper, tin and zinc. Preferred cell types are those that contain an aqueous alkaline electrolyte, such as alkaline cells that contain zinc as a negative or counter electrode active material, and cells that include, for example, one or more of manganese dioxide, silver oxide and a catalytic material for reduction of oxygen from outside the cell as a positive electrode active material. In one embodiment, the cell is a fluid-depolarized cell wherein the fluid utilized by the cells is preferably a gas such as oxygen. Fluid-depolarized electrochemical cells can include metal-air cells, such as zinc-air cells, or fuel cells.

Electrochemical cells of the present invention in various embodiments can also include a gas generating or catalytic electrode that produces gas by oxidation or reduction at the catalytic electrode. Examples of gasses capable of being generated by gas generating electrode include oxygen and hydrogen. For example, a gas generating cell can be provided, such as an alkaline cell having a counter electrode comprising a metal oxide, wherein, when current is forced to flow through the cell, the metal oxide is reduced to a lower oxidation state or the corresponding metal, and oxygen is evolved at the gas generating electrode. In the case of an embodiment of a hydrogen generating cell wherein hydrogen is evolved from the gas generating electrode, such as in an alkaline cell, oxygen is excluded from the gas generating electrode and hydrogen gas is generated within the gas generating electrode when an electric current is enabled to flow through the cell. Further explanations regarding gas generating cells and gas generating electrodes, and materials therefore, are set forth in U.S. Pat. Nos. 5,242,565; 5,707,499 and 6,060,196, herein fully incorporated by reference.

Figure 1:
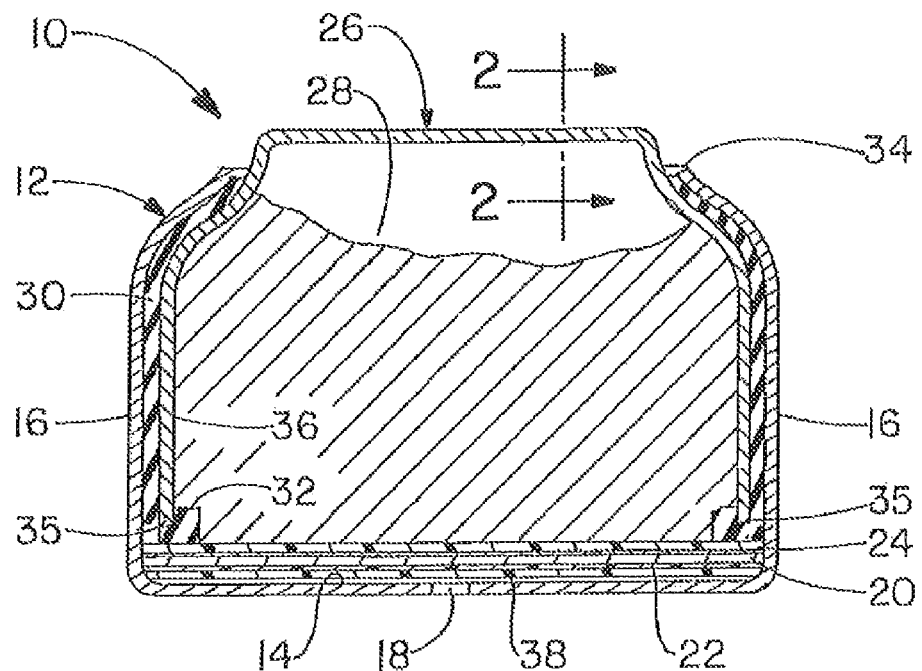
FIG. 1 is an elevational view, in cross-section, of a button-shaped hydrogen generating cell.
Figure 4:
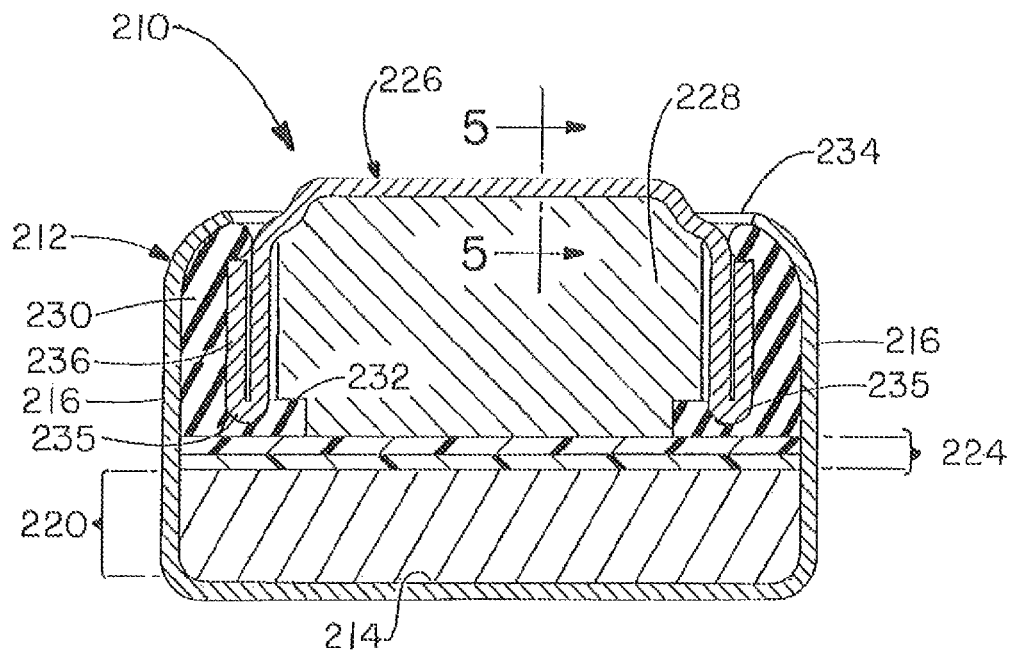
FIG. 4 is an elevational view, in cross-section, of a button-shaped electrochemical cell.

An embodiment of the invention is a metal/air cell as illustrated in FIG. 1, which is a cross section of a button-shaped cell. FIG. 4 illustrates a further embodiment of a button-shaped electrochemical cell according to the present invention. Button cells are generally cylindrical in shape and have maximum diameters that are greater than their total heights. The maximum diameter is generally between about 4 mm to about 35 mm, desirably from about 5 mm to about 35 mm. Preferably the maximum diameter is no greater than about 30 mm and more preferably no greater than about 20 mm. The button cells have a maximum height or thickness, measured perpendicular to the diameter, generally from about 1 mm to about 20 mm, desirably from about 1 mm to about 15 mm. Preferably the maximum height is no greater than about 10 mm and more preferably no greater than about 8 mm. While FIGS. 1 and 4 each refer to a button-type cell, it is to be understood that the invention is not limited thereto, and includes other cell types such as described hereinabove.

In FIG. 1, the cell 10 has a two-part metal housing containing a catalytic positive electrode 20 and a negative counter electrode 28, separated by an electrically insulating, ion permeably separator 24. One part of the metal housing, referred to as the casing or can 12, is in electrical contact with the catalytic electrode 20, and the other part of the housing, referred to as the casing or cup 26 is in contact with and serves as the current collector for the counter electrode 28. Between the can 12 and the cup 26 is an electrically insulating seal member, such as a grommet or gasket 30. The rim 34 of the can 12 is deformed inward and downward against the gasket 30 and cup 26 so that the gasket 30 provides a compression seal between the can and cup side walls 16 and 36, respectively. The gasket 30 has an inward extending base and a lip 32 that form a groove into which the bottom rim 35 of the cup 26 fits. The axial force applied by the bent rim 34 of the can 12 also creates a seal between the cup bottom rim 35 and the periphery of the inside surface of the can bottom 14. At least one aperture 18 is located in the can bottom 14 through which air containing oxygen used an active material by the catalytic electrode 20 can enter the cell 10. The catalytic electrode 20 includes a catalytic mixture with a metal screen or expanded metal current collector embedded in the surface facing the separator 24. The catalytic electrode 20 also includes a hydrophobic membrane 22 laminated to the side of the catalytic mixture opposite the separator 24. Located between the hydrophobic membrane 22 and the inside surface of the can bottom 14 is a gas diffusion layer 38.

A gas generating cell can have a construction similar to that of cell 10 in FIG. 1. The catalytic electrode 20 can be either a positive electrode or a negative electrode, and the counter electrode 28 can be either a negative or a positive electrode. In one embodiment of a gas generating cell, the gas diffusion layer 38 can have a high hydrogen permeability and a low oxygen permeability to allow hydrogen gas generated at the catalytic electrode 20 to escape from the cell through the aperture 18 while substantially blocking the entry of air from the external environment. An example of a suitable material for the hydrogen diffusion layer 38 is sintered polytetrafluoroethylene, such as virgin sintered PTFE membrane conforming to ASTM D3308 Type II and SAE AMS 3662C, an example of which is D/W 202 skived PTFE from DeWal Industries, Saunderstown, R.I., USA, 0.051 mm (0.0020 inch) thick and having typical tensile strength of 422 kg/cm$^2$ (6000 pounds per square inch), a typical elongation of 325 percent, a typical dielectric strength of 2000 volts, a typical BJH adsorption cumulative pore volume of 0.0004 to 0.0023 cm$^3$/g and a typical density of 2.1 to 2.2 g/cm$^3$.

FIG. 4 illustrates cell 210 of a similar construction to cell 10 shown in FIG. 1, and includes a two-part metal housing including a positive electrode casing or can 212, housing a positive electrode 220, and a negative counter electrode casing or cup 226 housing negative counter electrode 228 in contact therewith. The negative electrode cup 226 serves as the current collector for the negative electrode 228. The positive electrode casing 212 is in electrical contact with the positive electrode 220. Gasket 230 is disposed between can 212 and cup 226 with rim 234 of can 212 deformed against gasket 230 and cup 226, thereby providing a compression seal between the can 212 and cup 226 sidewalls 216 and 236, respectively. As indicated above, gasket 230 has an inward extending base and a lip 232 that forms a groove into which the bottom rim 235 of the cup 226 fits. Unlike cell 10, cell 210 has no aperture in base 214. Positive electrode 220 includes one or more active materials. In one embodiment the active material is manganese dioxide, in another embodiment the active material is silver oxide (such as monovalent silver oxide and/or divalent silver oxide), and in yet another embodiment the active material is a mixture of manganese dioxide and silver oxide. A separator 224 is disposed between the positive electrode 220 and the negative electrode 228.

In some embodiments, a refold anode cup such as cup 226 in FIG. 4 is utilized instead of a straight-walled anode cup such as cup 26 in FIG. 1. In both types, terminal ends 35, 235 define the opening in anode cups 26, 226. As known in the art, refold anode cups have rounded rims that are substantially U-shaped at the ends that define the openings in the anode cups. A refold anode cup is formed in one embodiment by folding a portion of the wall of the cup back upon itself so that the opening in the cup is defined by a folded rim. The refold anode cup 226 can be formed of the materials, dimensions and the like as described herein with respect to anode cup 26.

The cup 26, 226 forms the top of the cell 10, 210 when the cell is positioned as shown in FIGS. 1 and 4. It is made from a metal substrate with sufficient mechanical strength for the cup to withstand cell closing and sealing forces and maintain an adequate seal with the gasket 30, 230 and can 12, 212, even with the internal pressure that may be present in the cell 10, 210 during normal use. The cup 26, 226 has an interior or internal surface exposed to and having a portion in contact with the counter electrode 28, 228 and/or electrolyte. Cup 26, 226 also has an exterior or external surface exposed to the ambient environment outside of the cell 10, 210. The material of the substrate also has good electrical conductivity, since the cup 26, 226 serves as the current collector for the counter electrode 28, 228 and an external contact terminal for the cell 10, 210. The outer surface of the substrate has good corrosion and discoloration resistance in environments in which the cell 10, 210 will be used. In one embodiment, in order to minimize unwanted gas generation where electrolyte comes in contact with the cup 26, 226, the substrate has an essentially continuous layer of copper on the surface forming the inside of the cup 26, 226. In a further embodiment, the substrate has an essentially continuous layer of copper on the surface forming the outside of the cup 26, 226 in order to provide a desirable surface onto which a coating can be applied. The end of the cup 26, 226, located between the exterior surface and the interior surface of the cup, prior to any coating of plating applied thereto, theoretically is a cross section of the layers used to form the cup, for example copper-stainless steel-copper. Thus, prior to plating, the cup end may have one or more exposed layers, such as stainless steel, present between the cup exterior surface and interior surface.

The electrochemical cell 10, 210 according to the invention includes a cup 26, 226 that has a coating of one or more layers or regions deposited on the substrate in any suitable manner. A preferred method of the invention utilizes an electrolytic plating process to produce the coating on the substrate. For added protection against external corrosion and internal gassing, the cup 26, 226 can be post-plated (plated after forming the substrate into a cup shape) with a copper-tin-zinc alloy, that desirably coats all exposed surfaces of the formed cup 26, 226. The cup 26, 226 can be pre-plated in another embodiment, wherein prior to forming the substrate into the shape of a cup, one or more surfaces of the substrate are plated with a deposited coating of one or more layers. When a pre-plated cup is cut from a larger substrate, such as a sheet, strip or roll of material, and subsequently formed into the cup, the cut edges of the cup do not include the coating. In some embodiments, the cup 26, 226 can be both pre- and post-plated. The plating of the cup 26, 226 also provides the cell 10, 210 with an attractive appearance. The term "plating" utilized herein means electrolytic plating.

Figure 2:
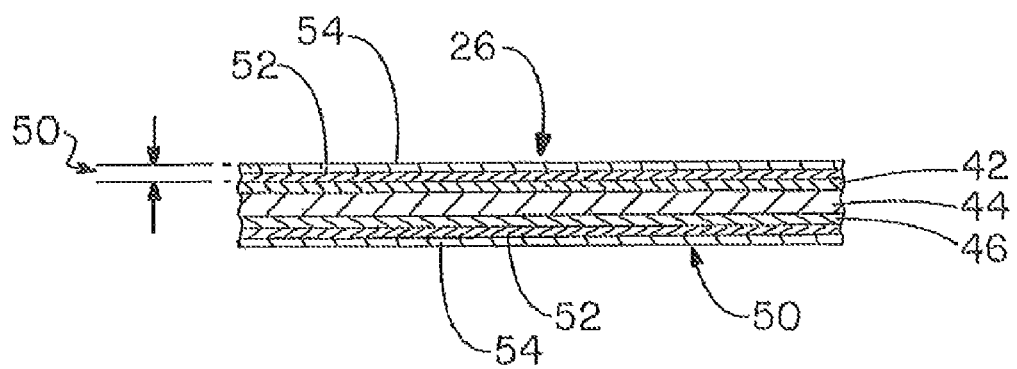
FIG. 2 is an enlarged cross-sectional view through the material construction of the cup of the cell in FIG. 1 taken at line 2-2, illustrating one embodiment of a clad material including a coating thereon.
Figure 5:
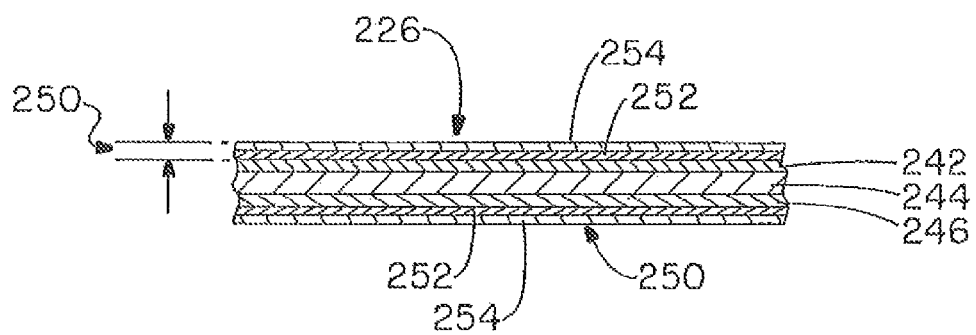
FIG. 5 is an enlarged cross-sectional view through the material construction of the cup of the cell in FIG. 4 taken at line 5-5, illustrating one embodiment of a clad material including a coating thereon.

In a preferred embodiment, the substrate of cup 26, 226 is a clad metal including a layer of copper, preferably on each of the exterior and interior surfaces of the cup substrate. The clad copper layer provides a continuous layer of copper. The copper layer is advantageous for a number of reasons. It has a relatively high hydrogen overvoltage, so if the copper-tin-zinc alloy plating is not continuous or is damaged during cell manufacturing, electrolyte will not be in direct contact with a high gassing, low hydrogen overvoltage metal. Copper is also relatively ductile, preventing the risk of cracking during the cup forming process to expose the lower hydrogen overvoltage metal layer beneath it. A clad material is preferred because the copper layer is continuous, and the composition of the layer to which it is clad can be selected to provide the required strength to the substrate. Preferably the copper layer is clad to a layer of steel, such as a mild steel, a cold rolled steel or, more preferably, a stainless steel. The substrate material can be a biclad material, or it can have three or more layers, such as a triclad material. The relative thicknesses of the layers and the total thickness of the substrate material can be selected to provide the best combination of strength, gassing resistance and corrosion resistance, based on the cell size and ingredients. A preferred triclad material is a copper-stainless steel-copper triclad material. The stainless steel of the preferred copper-stainless steel-copper triclad material provides structural rigidity and is present at a thickness of generally greater than 50%, desirably between about 60% to about 92%, and preferably at a thickness of about 85% based on the total thickness of the particular anode cup 26, 226 utilized. The thickness of the copper layer on the exterior surface of the substrate ranges generally from about 2% to about 20%, desirably from about 3% to about 10%, and preferably from about 3% to about 8% based on the total thickness of the anode cup 26. The thickness of the copper layer on the interior surface of the substrate ranges generally from about 5% to about 40%, desirably from about 6% to about 30%, and preferably from about 8% to about 15% based on the total thickness of the anode cup 26, 226. All values listed are prior to post-plating. FIG. 2 is a cross-section of the cup 26, shown in FIG. 1, taken at line 2-2, and FIG. 5 is a cross-section of the cup 226 shown in FIG. 4, taken at line 5-5, made from a preferred triclad substrate. The substrate has a stainless steel base layer 44, 244, an inner clad copper layer 46, 246 and an outer clad copper layer 42, 242.

A cup substrate having a copper layer present on each of the exterior and interior surfaces of the cup 26, 226 provides a number of benefits. Copper provides a desirable base or surface that is receptive to a coating, particularly a plating composition comprising copper, tin and zinc. By eliminating nickel from the surface of the substrate, both the interior and exterior surfaces, nickel contamination of a plating solution is prevented. The presence of nickel in a plating solution comprising copper, tin and zinc can lead to undesirable deposition of the nickel as part of the one or more layers of coating deposited on the cup substrate. Moreover, at relatively t higher levels of nickel, the bath efficiency can be reduced and the target thickness may not be achieved utilizing the same current density and plating times. The use of copper instead of nickel as a cup substrate exterior layer can also provide cost savings.

Providing a cup 26, 226 having a substrate with a copper exterior surface and interior surface can also reduce contamination that could otherwise be introduced during processing of the substrate from a sheet or disk into a cup. When nickel is utilized as a substrate exterior surface instead of copper, the nickel can potentially flake off or shed particles that can become embedded in the copper surface that forms the interior surface of the substrate, and provide a source of gassing in an assembled cell.

In addition, it has been found when a cup substrate has a copper exterior surface plated with a coating comprising copper, tin and zinc, the cup exterior surface is more resistant to discoloration under certain environmental conditions, particularly temperature and humidity, when compared to a cup substrate having a nickel exterior surface plated with a coating comprising copper, tin and zinc.

In a preferred embodiment, a coiled strip of the substrate material is formed into the desired shape using a stamping process using three or more progressively sized stamping dies, after which the anode cup is punched out of the coil. Using two or less dies to form an anode casing may contribute to undesirable cell gassing.

After the cup 26, 226 is formed from the substrate material, it is post-plated with one or more coatings or layers of a copper-tin-zinc alloy 50, 250 (FIGS. 2 and 5) to provide an interior surface layer that will gas less than a copper surface when in contact with the electrolyte and/or counter electrode 28, 228 and an exterior surface that is resistant to corrosion and discoloration. In the case of a pre-plated cup 26, 226, the one or more coatings are applied to one or more surfaces of the substrate material prior to forming the cup. In one embodiment the copper-tin alloy 50, 250 includes a first portion or layer 52, 252 and a second portion or layer 54, 254 externally positioned with respect to layer 52, 252 and having a higher weight percent tin content and a lower weight percent copper content when compared to the internal layer 52, 252. The cup 26, 226 can also be provided with a strike layer, such as a layer of copper, to improve adhesion of the copper-tin-zinc alloy. For example, a copper strike layer can be applied to a nickel-stainless steel-copper, nickel-stainless steel or steel cup 26, 226 to provide improved adhesion of the copper-tin-zinc layer(s) to the non-copper surface layer(s) of the cup 26, 226.

The composition of the copper-tin-zinc alloy can be selected to provide the desired plating coverage and adhesion, gassing and corrosion resistance, and appearance. Other metals are desirably avoided, but may be present due to impurities in the plating bath or solution. Because the plating current density is lower on the interior surface than on the exterior surface of the cup 26, 226, the composition of the plated alloy will tend to be different on the interior and exterior surfaces.

In one embodiment, the interior portion or layer, such as layer 52 or 252 of the plated alloy will preferably contain a ratio of 50 to 70 weight percent copper; 26 to 42 weight percent tin; and 3 to 9 weight percent zinc, measured at a central portion thereof, by scanning electron microscopy/energy dispersive X-ray spectroscopy (SEM/EDS) to provide low gassing within the cell. The lower limit for the amount of copper is more preferably at least 52 weight percent, and most preferably at least 56 weight percent. The upper limit for the amount of copper is more preferably at most 68 weight percent and most preferably at most 64 weight percent. The lower limit for the amount of tin is more preferably at least 28 weight percent, and most preferably at least 32 weight percent. The upper limit for the amount of tin is more preferably at most 39 weight percent and most preferably at most 36 weight percent. The lower limit for the amount of zinc is more preferably at least 4 weight percent. The upper limit for the amount of zinc is more preferably at most 8 weight percent and most preferably at most 7 weight percent. The composition of the alloy plating is determined with energy dispersive X-ray spectrometry (EDS) by bombarding the surface with a beam of high energy electrons in a scanning electron microscope (SEM). A LEO™ 438 VP scanning electron microscope (LEO Electron Microscopy Ltd.) and an OXFORD™ Ge-detector (Oxford Instruments PLC) with ISIS™ software (Isis Software) are suitable for SEM/EDS measurements. The measurements are performed on the central region of the boss flat area, i.e., not on a sidewall or curved connecting area between the sidewall and central region of the cup, and if both the inside and outside of the cup are plated, the measurements are performed on the outside of the cup. The central region is analyzed for composition of copper, tin and zinc in two different areas and averaged. The SEM parameters used for the measurements are: 400× magnification, 3.2 nA beam current, and 20 kV accelerating voltage. The composition of the adjacent surface of the cup substrate, for example nickel, detected during measurement on the outside central region of the plated cup, is not reported in the composition of the alloy. Resulting measurement values will be higher than actual when testing a cup substrate containing one or more same metals present in the substrate layer adjacent the plated layer. For example, copper measurement values will be higher than actual when testing the inside of a cup when a Ni/SS/Cu cup or Cu/SS/Cu cup is tested because of the copper clad layer beneath the copper, tin and zinc plating layer(s). Because the copper to tin to zinc ratio determined from SEM/EDS is the average for the entire coating, to determine the composition of any individual layer, the composition(s) and thickness(es) of the previously plated layer(s) must be taken into account.

X-ray photoelectron spectroscopy (XPS) is useful to determine atomic composition surface values of the plated alloy layers of the cup 26, 226. A sample to be measured is mounted on carbon tape and analyzed with, for example a PHI® 5600 ESCA system (Physical Electronics, Inc.). Each layer can be tested prior to plating a subsequent layer. If both the inside and outside of the cup 26, 226 are plated, the measurement is made on the outside of the cup 26, 226. Al Kα radiation (1486.6 eV) is used to excite photoelectrons for collection by a hemispherical analyzer. The step size is set to 0.4 eV, and the bandpass used is 93.9 eV. The elemental lines measured during depth profiling are the C1s, O1s, Cu2p3, Zn2p3 and Sn3d5. The sputter depth interval is 2.8 nm, based on $Ta_2O_5$ calibration, to a total depth of 112 nm. The composition is taken at the desired depth (100 nm) and normalized with respect to copper, tin and zinc to obtain a ratio. In one embodiment, the interior portion or layer, such as layer 52 or 252 of the plated alloy, preferably contains a ratio of 85 to 91 atomic percent copper; 6 to 11 atomic percent tin; and 2 to 6 atomic percent zinc, measured at a central portion of the casing, by XPS. The lower limit value of copper is more preferably at least 85 atomic percent, and most preferably at least 86 atomic percent. The upper limit value of copper is more preferably at most 89 atomic percent and most preferably at most 88 atomic percent. The lower limit value of tin is more preferably at least 7 atomic percent, and most preferably at least 8 atomic percent. The upper limit value of tin is more preferably at most 10 atomic percent and most preferably at most 9 atomic percent. The lower limit value of zinc is more preferably at least 2 atomic percent. The upper limit value of zinc is more preferably at most 4 atomic percent and most preferably at most 3 atomic percent.

It may be desirable to have a white appearance on the exposed outer surface of the cup 26, 226. The lower the copper content of the plated alloy and higher the tin content, the whiter its appearance will be. For a white color on the exterior surface of the cup 26, 226, the copper content on the plating surface will preferably be no more than 46 weight percent, and if the copper content is too high, the exterior surface of the cup 26, 226 will be susceptible to tarnishing, especially if exposed to alkaline electrolyte (e.g., aqueous KOH), such as during assembly. Therefore, in another embodiment having a cup 26, 226 with an exterior surface that has a white color and is also resistant to discoloration, the outer plated layer 54, 254 preferably has a ratio of copper from 36 to 46 weight percent, tin from 42 to 57 weight percent, and zinc from 6.5 to 9.5 weight percent measured by SEM/EDS as described above. The lower limit for the amount of copper is more preferably at least 38 weight percent, and most preferably at least 39 weight percent. The upper limit for the amount of copper is more preferably at most 44 weight percent and most preferably at most 43 weight percent. The lower limit for the amount of tin is more preferably at least 47 weight percent, and most preferably at least 48 weight percent. The upper limit for the amount of tin is more preferably at most 52 weight percent and most preferably at most 51 weight percent. The lower limit for the amount of zinc is more preferably at least 7.0 weight percent, and most preferably at least 7.5 weight percent. The upper limit for the amount of zinc is more preferably at most 9.0 weight percent and most preferably at most 8.5 weight percent.

In one embodiment, the exterior portion or layer, such as layer 54 or 254 of the plated alloy, has a ratio of atomic composition surface values of desirably from 73 to 84 atomic percent copper, 11 to 17 atomic percent tin, and 4 to 10 atomic percent zinc, measured at a central portion of the casing by XPS. If the cup 26, 126 is coated on both the inside and outside, the measurement is taken on the outside of the cup 26, 126. The lower limit value of copper is preferably at least 75 atomic percent, more preferably at least 76 atomic percent, and most preferably at least 77 atomic percent. The upper limit value of copper is preferably at most 83 atomic percent, more preferably at most 81 atomic percent and most preferably at most 80 atomic percent. The lower limit value of tin is preferably at least 12 atomic percent, and more preferably at least 12 atomic percent. The upper limit value of tin is preferably at most 16 atomic percent and more preferably at most 15 atomic percent. The lower limit value of zinc is preferably at least 5 atomic percent, and more preferably at least 6 atomic percent. The upper limit value of zinc is preferably at most 9 atomic percent.

In a further embodiment, the coating comprises one or more additional layers located between the interior layer 52, 252 and the exterior layer 54, 254 that each, independently, can have a different composition than the compositions of the interior and exterior layers.

In a preferred embodiment, a multi-step copper-tin-zinc alloy plating process is utilized. For example, the alloy plating is performed in one embodiment at two or more different current densities, at each current density for a period of time. The variable current density plating process can provide numerous benefits, including providing an efficient plating process in which a copper-tin-zinc alloy coating is formed having two or more regions or layers exhibiting different characteristics. In one embodiment, a first region or alloy layer, such as 52, 252, is plated at a relatively high current density, allowing rapid deposition of the alloy on the casing, and reducing the plating time required, while a final step of the alloy plating process is done at a different, preferably lower, current density to achieve a preferred composition in the outermost surface portion, i.e., a second region or layer, for example 52, 254 of the total plated alloy layer composition. The variable current density plating process is particularly useful and allows the alloy layer coating composition to provide a particular surface appearance, which may not be the best composition for resistance to cell internal gassing. However, a bulk of the plated alloy layer, that portion below the surface portion plated at a different current density, can be formed having a composition that is plated more quickly and is more resistant to internal gassing when compared to the surface portion. As used herein, unless otherwise stated, current density is expressed in units of current per total surface area of the parts being plated.

Regarding discovery of the variable current density plating process for negative electrode or counter electrode cups, it was observed that unplated cups formed from triclad material of nickel, stainless steel and copper were prone to leakage. In an attempt to prevent leakage, the cups 26, 226 were plated with a copper-tin-zinc layer utilizing a current density of about 43 amps per square meter (4 amps per square foot). However, some of the cups produced exhibited an initially inconsistent surface color and/or undesirable surface color. It was believed that the relatively high amounts of copper in the plated surface layer led to the inconsistent color. It was discovered that by lowering current density, copper content in the plated layer decreased and tin content in the plated layer increased. As indicated herein, by utilizing a variable current density process wherein relatively high current density is utilized during a first portion of the plating process and a lower current density, generally below about 21.5 amps per square meter (about 2 amps per square foot), is utilized during a final portion of the alloy plating step, a desirable plated cup 26, 226 is consistently formed. The variable current density plated cup exhibits a first region or layer, located closer to the cup substrate that has a greater copper content than a second upper region or layer of the plating, with the second region or layer having a higher tin content than the first region or layer and thereby providing a desired appearance on the surface that is resistant to discoloration, with the first region believably more resistant to internal gassing.

The total thickness of a plated copper-tin-zinc alloy coating, including one or more layers or regions on the formed cup 26, 226 is generally from 0.7 to 4.0 μm at the central portion of the cup. If both the inside and the outside of the cup 26, 226 are plated, the measurement is made on the outside. The lower limit of the indicated total plating thickness is desirably at least 1.0 μm and preferably at least 1.25 μm. The upper limit of the total plating thickness is desirably at most 3.0 μm, and preferably at most 2.5 μm. When a variable current density plating process is utilized, the surface or second portion or layer, such as layer 54, 254, of the alloy forms generally about 4.0 to about 20.0 percent, desirably about 6.0 to about 15.0 percent, and preferably about 10.0 percent of the total thickness of the plated alloy coating on the external surface of the central portion of the formed cup 26, 226. Thus, the thickness of the surface portion or layer, such as 54, 254, ranges generally from about 0.1 to about 0.5 μm, desirably from about 0.15 to about 0.40 μm, and preferably from about 0.20 to about 0.30 μm in one embodiment. As indicated hereinabove, the plated alloy layer may not have a distinct compositional boundary between layers or regions when variable current density plating is utilized. There may be a composition gradient or transition region between layers or sub-layers, such as between layers 52 and 54, and layers 252 and 254. If the copper-tin-zinc plating is too thin, there may be incomplete coverage of the cup 26, 226. If the plating is too thick, the cup 26, 226, can 12 and gasket 30 may not fit together properly during assembly of the cell 10. It is desirable to provide a continuous layer of the plating over the interior surface of the cup 26, 226 without causing cell assembly problems.

X-ray fluorescence (XRF) can be used to determine the total thickness of the coating. A flat circular disc is punched from the central portion of the cup. The disc is irradiated using an XRF spectroscope (e.g., available from Matrix Metrologies) that has been calibrated using copper, nickel and tin metal standards. The amount of tin is measured based on fluorescent X-rays emitted from the irradiated disc. The overall thickness of the coating is calculated using the measured amount of tin and the overall composition of the coating as determined by SEM/EDS (as described above). Thicknesses of the layers of the coating can be determined using focused ion beam microscopy (FIB). A coating of silicon dioxide about 5 μm thick is applied to the portion of the cup to be tested to protect the surface. A beam of high energy Ga ions is used to mill a trench through the copper-tin-zinc coating to create a thin cross section, using a Micrion™ 2500 FIB system (Micrion Corp., now FEI Company) for example. The cup is then tilted and imaged using a scanning electron microscope. The layers are then measured on the SEM image.

The can 12, 212 forms the bottom of the cell 10, 210 in FIGS. 1 and 4. It is made from a metal with sufficient mechanical strength for the cup to withstand cell closing and sealing forces and maintain an adequate seal with the gasket 30, 230 and cup 26, 226 even with the internal pressure that may be present in the cell 10, 210 during normal use. The material of the substrate also has good electrical conductivity, since the can serves as an external contact terminal for the cell 10, 210. The can 12, 212 is made from a material that has good corrosion resistance, both in environments in which the cell 10, 210 will be used and where in contact with internal components of the cell 10, 210. An example of a preferred material is nickel plated steel.

The gasket 30, 230 is made from an elastomeric material which provides a compressive seal for the cell 10, 210. Examples of suitable elastomeric materials include nylons. Optionally, a sealant may be applied to sealing surfaces of the gasket 30, 230, cup and/or can. Suitable sealant materials will be recognized by one skilled in the art. Examples include asphalt, either alone or in combination with elastomeric materials or ethylene vinyl acetate, aliphatic or fatty polyamides; and thermoplastic elastomers such as polyolefins, polyamine, polyethylene, polypropylene and polyisobutene. A preferred sealant is SWIFT® 82996, from Foxboro Adhesives, LLC, of Research Triangle Park, N.C., USA. As an alternative to a molded gasket 30, 230, an electrically nonconductive adhesive can be used to seal the inner surface of the can side wall 16, 216 to the outer surface of the cup side wall 36, 236. As used herein, the cup surface area exposed to the negative or counter electrode is that portion of the internal surface of the cup that is not covered by the gasket or adhesive and could come in contact with the negative or counter electrode and/or electrolyte.

The counter or negative electrode 28, 228 in one embodiment contains zinc as an active material and an aqueous alkaline electrolyte. The zinc is a low-gassing zinc. Examples of low gassing zincs are disclosed in U.S. Pat. Nos. 6,602,629 and 5,464,709; and U.S. Patent Publication No. 2005/0106461 A1, which are hereby incorporated by reference.

A preferred zinc, as disclosed in U.S. Patent Publication No. 2005/0106461 A1, is a zinc alloy powder containing bismuth, indium and aluminum, preferably about 100±25 parts per million by weight (ppm) of bismuth, about 200±30 ppm of indium and about 100±25 ppm of aluminum. The alloy preferably contains about 35±10 ppm of lead. The preferred average particle size ($D_{50}$) for metal-air cells is less than 130 microns, more preferably about 90 to about 120 microns. Preferred characteristics of the alloy include a tap density greater than 2.80 g/cc and less than 3.65 g/cc, a BET specific surface area greater than 400 $cm^2/g$, and a KOH absorption value of at least 14 percent. Examples of preferred zinc powders for metal-air cells are product grades NGBIA 100, NGBIA 110 and NGBIA 115, manufactured by N.V. Umicore, S.A., Brussels, Belgium, most preferably NGBIA 115. A preferred zinc powder for zinc/metal oxide or dioxide cells such as zinc/silver oxide cells is BIA, also available from N.V. Umicore. The electrolyte can include potassium hydroxide. In some embodiments, sodium hydroxide can replace all or part of the potassium hydroxide.

The counter or negative electrode 28, 228 is preferably a gelled electrode, using a binder or gelling agent. Examples of suitable gelling agents for metal-air cells include acrylic acid polymers in the 100% acid form, such as CARBOPOL® 940 and CARBOPOL® 934 from Noveon Inc. of Cleveland, Ohio, USA, and a crosslinked sodium polyacrylate, such as SANFRESH™ DK-300 and DK-500 MPS from Tomen America, New York, N.Y., USA. SANFRESH™ DK-300 is preferred. Examples of suitable gelling agents for zinc/metal oxide cells include carboxymethyl cellulose (CMC) from Hercules of Wilmington, Del., USA and a modified CMC available from FMC Corporation of Philadelphia, Pa. (USA) as AC-DI-SOL®.

The counter electrode 28, 228 can contain other ingredients, to reduce gassing or to improve cell performance, for instance. Examples include zinc oxide, indium hydroxide, and one or more surfactants. A preferred surfactant for both metal-air cells and zinc/metal oxide cells is an anionic polymer surfactant, such as DISPERBYK® D102 and D190 from Byk Chemie of Wallingford, Conn., USA.

The catalytic electrode 20 has a layer of a catalytic mixture, in which the hydrogen generating reaction takes place when the cell is a hydrogen generating cell. The mixture can include carbon, such as PWA carbon from Calgon Corp., Pittsburgh, Pa., USA, or DARCO® G60 carbon from American Norit Co., Inc., Marshall, Tex., USA, and a catalytic material, such as a manganese oxide, held together by a binder, such as a polytetrafluoro-ethylene resin. The catalytic material is optional for a hydrogen generating cell but is required for an oxygen generating cell and a zinc-air battery cell. This layer is somewhat porous to allow the mixture to be wetted by electrolyte. Water in the catalytic electrode 20 reacts to produce hydrogen gas in a hydrogen generating cell. The current collector can be an electrically conductive, corrosion resistant metal in the form of a wire screen or expanded metal; nickel is an example of a suitable material. The hydrophobic membrane laminated to the catalytic layer provides a barrier to water loss from the cell or water gain into the cell. It will have sufficient strength to withstand the electrode lamination process and forces applied during cell closing, and it will be stable when in contact with the electrolyte. Polytetrafluoro-ethylene film is an example of a suitable material.

A diffusion layer 38 is located between the hydrophobic membrane 22 of the catalytic electrode 20 and the can bottom 14 when the cell is a hydrogen generating cell. This diffusion layer 38 has sufficient permeability to oxygen in non-hydrogen generating cells to allow oxygen from outside the cell 10 to diffuse to the catalytic electrode 20 through the aperture 18 in the can bottom 14. An example of a suitable material for the oxygen diffusion layer 38 is a PTFE film.

In embodiments of electrochemical cells having a positive electrode containing an active material such as silver oxide, manganese dioxide, or the like, the positive electrode can be a disk-shaped pellet molded from a mixture containing active material, an electrically conductive material and a binder. The positive electrode pellet can be disposed directly against and extending across the bottom inside surface of the catalytic electrode can 212 so that the periphery is compressed between the gasket base and the inside surface of the can, as shown in FIG. 4. As silver oxide is slightly soluble in alkaline electrolyte, at least one layer of the separator must be impermeable to silver ions. The specific materials and relative amounts in the catalytic electrode can vary depending upon factors including end uses. Electrically conductive material can be graphite, for example. The alkaline electrolyte desirably contains potassium hydroxide or both potassium hydroxide and sodium hydroxide.

A sealant such as a thermoplastic hot melt adhesive, for example SWIFT® 82996 from Forbo Adhesives, LLC of Research Triangle Park, N.C., USA, can be used to bond peripheral portions of the catalytic electrode 20 and the diffusion layer 38 together and/or to bond the peripheral portion of the diffusion layer 38 to the peripheral portion of the can 20 to provide an improved cell seal.

A layer of porous material can be positioned between the diffusion layer 38 and the central portion of the can bottom 14. If this layer is included, it does not extend to the peripheral portion of the diffusion layer 38, so that the peripheral portion of the barrier membrane can seal tightly against the can bottom 14.

The separator 24, 224 is electrically nonconductive and ion permeable to electrically insulate the catalytic electrode 20, 220 from the counter electrode 28, 228, while allowing ions to pass through. The separator 24, 224 can include one or more layers, and the layers can be the same or different materials. A preferred separator 24, 224 has two layers, one an air-permeable, water-wettable nonwoven polypropylene film treated with surfactant, such as CELGARD® 5550, from Celgard, Inc., Charlotte, N.C., USA, next to the counter electrode 28, 228, and the other a hydrophobic polypropylene membrane, such as CELGARD® 3501, against the catalytic electrode 20, 220. The layers of separator 24. 224 are preferably adhered to the catalytic electrode 20, 220 and each other with an adhesive, such as a blend of carboxymethylcellulose and polyvinyl alcohol (9 to 1 by weight). In an embodiment where the catalytic electrode includes one or more silver oxide and manganese dioxide, the separator is preferably a laminated material with layers of cellophane and polyethylene. In a cell with a positive electrode 220 comprising silver oxide, the separator 224 is resistant to silver ions. In such cells, the separator 224 can include a barrier layer such as a polyethylene/cellophane laminate impervious to silver ions but not hydroxyl ions and a soak-up layer made from a material such as cellulose or polyvinyl alcohol that will retain electrolyte solution and allow hydroxyl ions to pass between the positive and negative electrodes 220 and 228.

During manufacture of the cell 10, 210, the cup 26, 260 is preferably inverted, and the components of the counter electrode 28, 280 are put into the cup 26, 260. The components can be inserted in a two step process wherein dry materials (e.g., the zinc, binder and $In(OH)_3$) are dispensed first, followed by the electrolyte solution, which can include aqueous KOH solution, surfactant and zinc oxide, for example. Alternatively, the wet and dry components can be blended beforehand and then dispensed or extruded in one step into cup 26, 226. The gasket 30, 230 is then placed over the cup rim 35, 235.

The diffusion layer 38 when present, electrode 20, 220 and separator 24, 224 can be inserted into the can 12, 212, which is then inverted and pressed against the cup/gasket assembly. The can rim 34, 234 is deformed inwardly, so it is compressed against the gasket 30, 230, thereby sealing the cell components within the housing.

Any suitable method may be used to deform the edge of the casing inward to seal the cell, including crimping, colleting, swaging, redrawing, and combinations thereof as appropriate. Preferably the button cell is sealed by crimping or colleting with a segmented die so that the cell can be easily removed from the die while a better seal is produced. As used herein, a segmented die is a die whose forming surfaces comprise segments that may be spread apart to enlarge the opening into/from which the cell being closed is inserted and removed. Preferably portions of the segments are joined or held together so they are not free floating, in order to prevent individual segments from moving independently and either damaging the cell or interfering with its insertion or removal. Preferred crimping mechanisms and processes are disclosed in commonly owned U.S. Pat. No. 6,256,853, which is hereby incorporated by reference.

After a metal-air cell 10 is assembled, a suitable tab or adhesive tape (not shown) can be placed over the aperture 18, 218, when present in the can bottom 14 until the cell 10 is ready for use.

As described above, the cup 26, 226 is plated with a layer or coating of a copper-tin-zinc alloy after the substrate material has been formed into the desired shape. Any suitable process can be utilized to plate the cup. A preferred process for applying the coating is electroplating. Examples of electroplating devices include, but are not limited to, a barrel plating device, a rack plating device, a vibratory plating device, and a spouted bed electrode plating device. The copper-tin-zinc alloy can be applied directly to the formed cup substrate or at least a portion of the substrate may be coated with another metal, such as copper, nickel or tin before the layer of copper-tin-zinc alloy is applied to the cup. The intermediate metal coating can include one or more metals or alloys and can be applied as an activation strike layer, for example, in order to facilitate deposition of the copper-tin-zinc layer.

In a preferred embodiment, the post-plating of cups 26, 226 is performed using a spouted bed electrode plating device. An example of a spouted bed electrode plating device is set forth in U.S. Pat. No. 6,193,858, herein fully incorporated by reference. A preferred spouted bed electrode plating device is commercially available from Technic Inc. of Pawtucket, R.I. The spouted bed electrode plating device utilizes solution streams of various compositions that circulate the anode cups in a cycle or travel path through a vessel during process steps such as cleaning, activation, plating, passivation and rinsing. The spouted bed electrode plating device can include one or more and preferably a plurality of stations, such as but not limited to, a plating chamber, a cleaning station, a rinse station, an activation station, and a passivation station that can be utilized in the anode cup tin plating process. The plating process is preferably conducted in a clean room environment. Providing plating on the interior surface of the cup 26, 226 is only preferred for zinc-metal oxide cells, especially those utilizing silver oxide as active material for the positive electrode.

Figure 3:
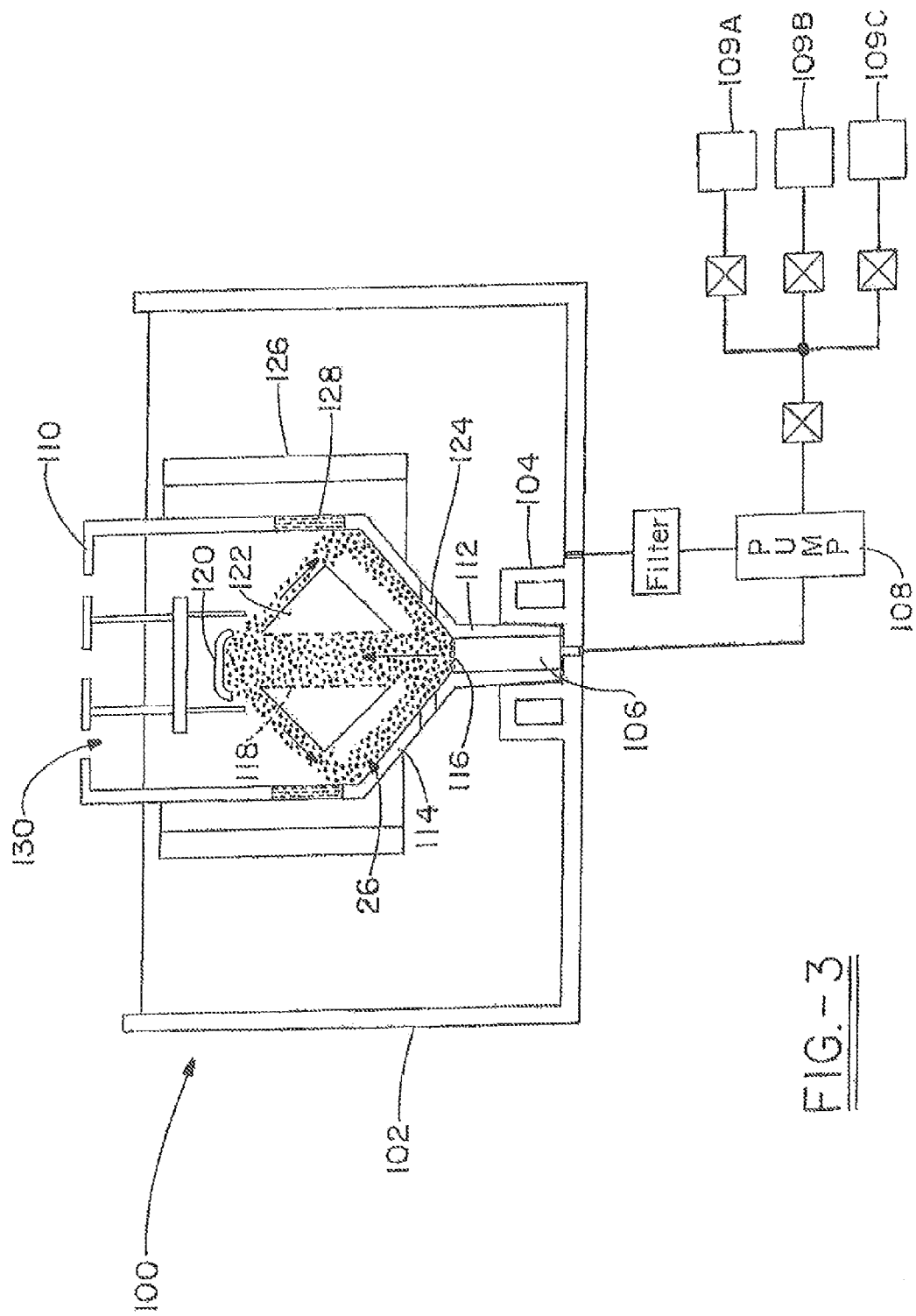
FIG. 3 is a schematic illustration of one embodiment of a spouted bed electrode plating device, including a plating chamber, for use in plating cups of the present invention.

An example of one embodiment of a spouted bed electrode plating device plating chamber 100 is shown in FIG. 3. Plating chamber 100 includes a tank 102 having a fluid circulation receptacle 104 therein. Receptacle 104 is preferably connected to the bottom of tank 102 and includes a fluid aperture 106 through which a solution or fluid can pass. A vessel 110 is removably connected to receptacle 104 such that fluid can pass through fluid aperture 106 into an inlet flange 112 of vessel 110. After the plating process has been performed, vessel 110 including cups 26, 226, can be removed from receptacle 104 of the plating chamber 100 and transferred to another station of the spouted bed electrode plating device or elsewhere for further processing.

Vessel 110 is generally a vertically extending cylinder having a conical bottom 114. The cups 26, 226 to be plated are loaded into vessel 110. Vessel 110 is immersed in a plating solution, such as described below, contained within tank 102 at a desired level or volume sufficient to perform the plating step on the cups 26, 226, and vessel inlet flange 112 is connected to fluid aperture 106 in plating chamber 100. The plating solution is introduced into vessel 110 at a relatively high velocity (e.g., from about 18.9 to about 56.8 liters (5.0 to 15.0 gallons) per minute, preferably from about 30.3 to about 39.7 liters (8.0 to 10.5 gallons) per minute) through inlet flange 112. Gravity pulls cups 26, 226 down along conical bottom 114 and radially inward towards screen 116 of inlet flange 112. The cups 26, 226 in the area above screen 116 are forced upwards along with the plating solution into shaft 118 in vessel 110. The cups 26, 226 and plating solution contact a deflector plate 120 located above shaft 118 and are directed radially outward and downward along conical deflector 122. The cups 26, 226 fall off of conical deflector 122 and rejoin the bed of cups 26 at conical bottom 114.

A circular anode 126 in the form of a basket or mesh surrounds vessel 110 and current is conducted from anode 126 to a circular cathode ring 124 through solution output screen 128 in a side wall of vessel 110 and any cups 26, 226 and plating solution therebetween. In one embodiment, the anode 126 includes titanium clad copper rods. The plating solution is able to exit vessel 110 through the solution output screen 128 and can be recirculated back to vessel 110. The circular anode 126 basket surrounding vessel 110 maintains the same distance between the anodes and the cathodic moving bed of cups 26, 226, resulting in a uniform plating current density. The cups 26, 226 are plated when they settle on the bottom of vessel 110, in direct electrical contact with the cathode ring 124. The design of vessel 110 distributes the cups 26, 226 thereby preventing nesting thus providing complete plating coverage of the entire surface of each cup 26, 226. Anode basket 126 and cathode ring 124 are connected to a suitable power supply and control panel.

The plating or other solution, or components of a solution, can be housed in a tank such as 109A, B or C as illustrated in FIG. 3 until needed. At that time, pump 108 is utilized to circulate the solution within vessel 110 and/or to and from a predetermined tank or tanks, such as 109A, B and C. One or more filters can be used to remove contaminants from the plating solution. Spouted bed electrode plating chamber 100 can include any number of lines, pumps, filters, and valves to provide a desired process loop.

A predetermined volume and concentration of a plating solution containing copper, tin and zinc is utilized in plating chamber 100. The amount of plating solution is dependent upon factors such as the dimensions of the plating chamber 100, as well as the volume of parts to be plated. For example, in one embodiment a volume of about 500 ml of cups 26, 226, generally having a weight from about 218.3 to about 408.2 grams (7.7 to 14.4 ounces), depending on the size of the anode cups, is utilized per batch in the plating solution. In a preferred embodiment, about 83 liters of plating solution comprising copper, tin and zinc metal salts, cyanide and caustic, one or more brightening agents and water are utilized in plating chamber 100. The amount of plating solution and components thereof can be adjusted to achieve desired plating characteristics on the cups 26, 226. Plating chamber 100 preferably includes a chiller in order to maintain the plating composition within a predetermined temperature range, as described below. In a preferred embodiment, a mechanical vibrator is utilized to vibrate vessel 110 during the plating process.

The plating solution preferably comprises tin in the form of tin cyanide, copper in the form of copper cyanide, and zinc in the form of zinc cyanide, in addition to potassium cyanide, caustic, and two brighteners, such as present in MIRAL-LOY® 2844 plating solution from Umicore Galvanotechnik GmbH, Schwäbisch Gmünd, Germany. The copper cyanide is present in an amount generally from about 6 g/liter to about 18 g/liter, and preferably about 8 g/liter to about 16 g/liter. The tin cyanide is present in an amount generally from about 35 g/liter to about 130 g/liter, and preferably from about 50 g/liter to about 110 g/liter. The zinc cyanide is present in an amount generally from about 0.40 g/liter to about 1.5 g/liter, and preferably from about 0.75 g/liter to about 1.25 g/liter.

The plating solution also can include, but is not limited to, various components such as caustic, brightening agents, antioxidants, water, or the like.

Examples of suitable caustics include potassium hydroxide and sodium hydroxide. In a preferred embodiment, the caustic is utilized in an amount generally from about 15 to about 45 g/liter, and preferably about 20 to about 40 g/liter. In a preferred embodiment, the potassium cyanide is utilized in an amount generally from about 45 to about 95 g/liter, and preferably from about 50 to about 85 g/liter.

The thickness of the copper-tin-zinc alloy plating on cups 26, 226 depends upon a number of factors including the current applied, current density, plating time, weight of anode cups in vessel 110 to be plated, metals content of the plating bath, and flow rate of plating solution through vessel 110. In one embodiment, plating time ranges from about 5 minutes to about 70 minutes, desirably from about 15 minutes to about 50 minutes, and preferably from about 20 minutes to about 35 minutes. As described herein, in a preferred embodiment of the present invention, it is desirable to utilize a variable current density process including plating at two or more different current densities in order to provide a plated copper-tin-zinc alloy coating with desirable characteristics. In a preferred embodiment, a copper-tin-zinc alloy layer or region is plated at a higher current density and a second copper-tin-zinc alloy layer or region is plated subsequently utilizing a lower current density and preferably forms the exterior, exposed surface of the cup. The variable current density process can be performed in one or more plating baths or solutions. In a preferred embodiment, the cups are plated with the copper-tin-zinc alloy at a higher current density for a period of time and then the current density is reduced to a second lower current density, while the cups are maintained in the same solution, for an additional period of time. Cathode current density for the relatively higher current density ranges generally from about 10 to about 1,076 amps per square meter (1 to 100 amps per square foot). The higher current density is more preferably at least 16 amps per square meter (1.5 amps per square foot) and most preferably at least 26.9 amps per square meter (2.5 amps per square foot). The higher current density is preferably at most 107.6 amps per square meter (10 amps per square foot) and most preferably at most 86.1 amps per square meter (8 amps per square foot). In one embodiment of the present invention, the relatively lower current density ranges generally from about 1.0 to about 27.0 amps per square meter (0.1 to 2.5 amps per square foot). The lower current density is preferably less than 21.5 amps per square meter (2 amps per square foot). The lower current density is more preferably at least 4.3 amps per square meter (0.4 amps per square foot) and most preferably at least 6.4 amps per square meter (0.6 amps per square foot). The lower current density is more preferably at most 16.2 amps per square meter (1.5 amps per square foot) and most preferably at most 12.9 amps per square meter (1.2 amps per square foot). While the ranges for the higher current density plating and the lower current density plating provided overlap, it is to be understood that the lower current density is always lower than the higher current density value utilized. As indicated hereinabove, the resulting copper-tin-zinc alloy plating forms a layer or region having a surface portion exposed to the ambient atmosphere when assembled in a finished cell that has a greater weight percentage of tin and a lesser weight percentage of copper than a lower, internal region or layer of the copper-tin-zinc alloy plated coating.

Flow rate of the plating solution ranges generally from about 11.4 to about 75.7 liters per minute, desirably from about 22.7 to about 56.8 liters per minute, and preferably from about 30.3 to about 37.9 liters per minute measured at an in-line flow meter located between pump 108 and vessel 110. The flow rates of other solutions, i.e. rinsing solutions, alkaline cleaning solutions, acid etching or cleaning solutions, passivating solutions, etc. utilized in the other processes described, independently, can vary within the same ranges as the flow rate ranges described above for the plating solution. The plating composition is maintained during plating at a temperature generally from about 50° C. to about 70° C., desirably from about 56° C. to about 64° C., and preferably from about 60° C. to about 64° C.

The method for plating the cups 26, 226 preferably includes one or more preplating steps performed before the copper-tin-zinc alloy plating step, and one or more postplating steps performed after the cups 26, 226 have been plated. The spouted bed electrode plating device is preferably utilized in one embodiment to perform one or more of the preplating or postplating steps in addition to performing the plating of the cups 26, 226. In a first step, a predetermined amount of anode cups are loaded into vessel 110. In one embodiment, vessel 100, including the cups 26, 226, is moved from a first station of the spouted bed electrode plating device whereat a first process step is performed to at least a second process station whereat a second process step is performed, wherein one of the process steps involves plating the anode cup with a copper-tin-zinc alloy. In an alternative embodiment, the vessel 110 is maintained at one station, such as described in U.S. Pat. No. 6,193,858 herein incorporated by reference, and the copper-tin-zinc alloy plating process and at least one other process is performed at the station, preferably in sequence by cycling different treating solutions through the station.

The following cup processing steps are described with reference to the spouted bed electrode plating device having multiple stations, but it is to be understood that, as described, the same process steps can be performed at a single station.

In a preferred embodiment, the negative electrode or counter electrode cups 26, 226 are processed in the vessel 110 of the spouted bed electrode plating device by subjecting the cups to an alkaline cleaning process, after which the cups are rinsed, preferably with water, most preferably deionized water. The cups are then subjected to an acid cleaning or etching step followed by a further rinsing step. The cups can then optionally be pre-treated with a cyanide solution (e.g., about 8.22 g/liter (5 ounces/gallon) of water) pre-dip just prior to plating the copper-tin-zinc alloy. Subsequently, the cups 26 are copper-tin-zinc alloy plated and rinsed again. The cups are subsequently passivated utilizing either an acid post-dip followed by a caustic post-dip or a salt post-dip, then rinsed, and subsequently dried.

The alkaline cleaning step is utilized to remove residue, if present, on the surface of the cups. Accordingly, in one embodiment, the alkaline cleaning step is not performed, generally when the cups are relatively clean. The cups 26, 226 are cleaned by circulating the cups 26, 226, such as described hereinabove with respect to copper-tin-zinc alloy plating, in vessel 110 utilizing an alkaline cleaning solution. In a preferred embodiment, ATOTECH™ 373 metal cleaner from Atotech USA Inc. of Rock Hill, S.C. is utilized as a cleaning agent. The ATOTECH™ 373 is mixed with water, preferably deionized water, in an amount generally from about 14.64 to about 109.48 milliliters per liter (about 2 to about 14 ounces per gallon), desirably from about 31.28 to 93.84 milliliters per liter (about 4 to about 12 ounces per gallon), preferably from about 46.92 to about 78.20 milliliters per liter (6 to about 10 ounces per gallon), and most preferably 62.56 milliliters per liter (about 8 ounces per gallon) of water to form a cleaning solution. The alkaline cleaning solution is maintained at a temperature of generally from about 48.89° C. (120° F.) to about 60.0° C. (140° F.), and preferably from about 48.88° C. (120° F.) to about 60.0° C. (140° F.). The alkaline cleaning step is generally performed until the cups 26 have been cleaned to a desired degree, and generally from about 3 to about 5 minutes. A vibration device, such as described above, is utilized to vibrate the vessel 110 containing the cups 26, 226 in one embodiment. The vibration device is preferably attached to vessel 110 and thus is transported from station to station. The vibration device is optionally, but preferably, used at each station, unless otherwise indicated.

After the alkaline cleaning step, the vessel 110 is transferred to a rinsing station. Water, preferably deionized water, is utilized to rinse the cups to remove any remaining alkaline cleaning solution to prevent carryover into the next step in the plating process. In the rinsing step, the cups are circulated in vessel 110, such as described hereinabove with respect to tin plating. In one embodiment, the cups 26, 226 are rinsed in two separate tanks for a period of time ranging generally from about 10 to about 60 seconds per tank. Optionally, cups 26, 226 in vessel 110 may be manually spray rinsed, preferably with agitation, in a separate tank before being processed in the rinse tank. The vibration device is preferably not utilized during the manual spray rinsing.

The rinsed cups 26, 226 are transferred to an activation station wherein the cups 26, 226 are circulated along with an activation solution within vessel 110. The cup activation preferably utilizes an acid solution, containing an acid such as sulfuric acid. Other acids can be used. Preferably the acid is one that generates little gas and will not attack the cup during activation. Preferably the acid anion is the same as the tin anion in the plating solution. The acid is present in an amount generally from about 6 to 14 weight percent, desirably about 8 to 12 weight percent, and preferably about 10 weight percent based on the total weight of the solution. The activation step activates the surface of the cups 26, 226 for plating. The cups 26, 226 are circulated in vessel 110 for a period of time ranging generally from about 1 to about 10 minutes. The activation solution is maintained at a temperature generally from about 12.78° C. (55° F.) to about 35° C. (95° F.), and preferably from about 18.33° C. (65° F.) to about 35° C. (95° F.).

Subsequent to activation, the cups 26, 226 are preferably rinsed at a further rinsing station in order to reduce carryover of activation solution into the copper-tin-zinc alloy plating station. The anode cups are preferably circulated in vessel 110 with water, preferably deionized water, preferably utilizing the vibration device, for a period of time ranging generally from about 10 to about 40 seconds.

After the rinse step, the copper-tin-zinc alloy plating process step is performed as described hereinabove utilizing plating chamber 100.

After the cups 26, 226 have been plated with the copper-tin-zinc alloy, the anode cups are spray rinsed in vessel 110, in an appropriate tank, preferably with water utilizing a vibration device as described hereinabove. Rinsing is generally performed for a period of time until observation of foaming ceases. Rinse times generally range from about 1 to about 2 minutes.

In a further step, the cups 26, 226 are subjected to one or more subsequent rinses in one or more tanks utilizing water, preferably deionized water as described hereinabove, wherein the cups 26, 226 are circulated in vessel 110. The purpose of the rinse is to remove any plating solution and cyanide residue prior to a passivation step. The vessel 110 is preferably vibrated during the one or more rinsing steps. The cups are rinsed for a period of time from about 60 to 90 seconds in each tank.

In yet another step in the copper-tin-zinc plating process of cups 26, 226 of the present invention, the plated cups 26, 226 are passivated in a passivation step. Several passivation processes can be used. In one passivation process the cups are circulated in vessel 110 with a passivation solution containing an acid, such as 2 volume percent sulfuric acid. The cups 26, 226 are circulated in vessel 110 along with passivation solution, preferably using the vibration device, for about 10 to 30 seconds. The temperature of the passivation solution preferably ranges from about 17.78° C. (64° F.) to about 28.89° C. (84° F.), and more preferably from about 23.33° C. (74° F.) to about 26.66° C. (80° F.). Following the acid passivation step, the cups 26, 226 are circulated in vessel 110 with an additional passivation solution comprising a base such as, but not limited to, sodium hydroxide or potassium hydroxide. The passivation solution is about 1.5 weight percent RAYON® grade NaOH. The cups 26, 226 are circulated in vessel 110 along with the passivation solution, preferably utilizing the vibration device, for a period of time ranging generally from about 10 to about 30 seconds. Temperature of the passivation solution ranges generally from about 17.78° C. (64° F.) to about 28.89° C. (84° F.), and preferably from about 23.33° C. (74° F.) to about 26.66° C. (80° F.). The passivation step generally prevents discoloration of the copper-tin-zinc alloy surface on the cup 26, 226. Afterwards, the passivation solution is drained from the cups 26, 226. In an alternative passivation process, the cups are circulated in a vessel 110 with a passivation solution comprising a salt solution, such as a solution of about 50 g/liter of MIRALLOY® Post Treatment Salt, for about 30 to 120 seconds, preferably at about 17.78° C. (64° F.) to about 28.89° C. (84° F.), and more preferably from about 23.33° C. (74° F.) to about 26.66° C. (80° F.).

After the cups 26, 226 are processed in the passivation step, the cups 26, 226 are rinsed for a suitable period of time, preferably utilizing spray rinsing or water circulation, preferably deionized water circulation, with the cups 26, 226 as described hereinabove. A vibration device is preferably utilized during circulation of the anode cups within vessel 110. In a preferred embodiment, the cups 26, 226 are first spray rinsed for about 1 to about 2 minutes, tank rinsed via circulation in vessel 110 for about 60 to 90 seconds, and further spray rinsed for about 1 to about 2 minutes until substantially any remaining passivation solution is removed and there is no observation of foaming in the rinse.

In a further step, the plated cups 26, 226 are dried utilizing forced air and movement of the cups. Any suitable drying process can be used. For example, hot air can be forced through a spin dryer, a rotating perforated drum, or an auger system. At a drying station according to one embodiment, heated air (e.g., from about 65.56° C. (150° F.) to about 104.44° C. (220° F.) is forced through the inlet flange 112 of vessel 110. In the drying process, internal deflector plate 120 is generally not utilized and the anode cups are dried by forced air movement through vessel 110 and vibration of vessel 110 utilizing a vibration device such as described hereinabove. The cups 26, 226 generally remain at the drying station until dry with suitable drying times ranging generally from about 4 to about 20 minutes, and preferably from about 12 to about 20 minutes.

After the cups 26, 226 are dried, the same are removed from vessel 110 and incorporated into the cells 10, 210 as described above.

Example 1

Four lots of PR41 type zinc-air electrochemical battery cells were made to evaluate the effects of hydrogen gassing. All lots were identical except for plating of the anode cup, the type of zinc used and the type of surfactant contained in the counter (negative) electrode. The negative electrodes contained 77.8 weight percent anode mix and 22.2 weight percent electrolyte solution. The anode mix contained zinc, 0.25 weight percent SANFRESH® DK-300 gelling agent, and 450 parts per million by weight In(OH)$_3$. The electrolyte contained aqueous KOH (33 weight percent KOH in water), 1 weight percent ZnO, and 100 parts per million by weight DISPERBYK® 102 surfactant.

Post-plating of anode cups was done using the SBE process described above, with the alloy plating done at a single current density. Each lot had an anode cup formed from nickel-stainless steel-copper triclad strip, with copper on the interior surface of the cup; a nickel plated steel cathode can; an injection molded nylon gasket sealed between the cup and the can; a gelled electrolyte zinc negative electrode; and a catalytic (positive) electrode. The negative electrode contained zinc, potassium hydroxide electrolyte solution and gelling agent, as well as zinc oxide and indium hydroxide. The positive air electrode had an active layer containing manganese oxide, carbon and a PTFE binder. A nickel expanded metal screen was embedded into the side of the active layer facing the negative electrode, a layer of PTFE film pressure laminated onto the surface of the active layer facing the bottom of the can, two layers of polypropylene separator glued to the surface of the active layer facing the negative electrode. A loose layer of PTFE film was located on the side of the air electrode facing the can bottom, with a loose layer paper between the loose layer of PTFE and the inside surface of the can bottom. The anode cup plating, zinc type and surfactant type for each lot is summarized in Table 1. ZCA 1230 zinc is a low-gassing zinc as described in U.S. Pat. No. 6,602,629 and is available from Zinc Corporation of America, Monaca, Pa., USA.

After the cells were assembled the holes in the can bottoms were sealed with an adhesive tape, and the cells were aged for about 2 days before testing. Samples from each lot were tested on a sealed cell open circuit voltage (SCOCV) test and a limiting current test, and the results are summarized in Table 1.

The SCOCV test method was:
1. Seal the holes in the can bottoms with an adhesive tape.
2. Age the cells for 4 to 7 days, remove the tape.
3. Apply a layer of epoxy (e.g., HARDMAN® epoxy from Royal Adhesives and Sealants of Bellville, N.J., USA, or DEVCON® epoxy from ITW Devcon of Danvers, Mass., USA) to a tray, then press the cells into the layer of epoxy with the can bottom facing the tray to seal the holes in the can bottoms and prevent any additional air from entering the cells through the holes.
4. Store the epoxy-sealed cells for 7 days at 45° C. and then test the open circuit voltage (OCV) at room temperature. The average OCV's are shown in Table 1.

The limiting current was measured by storing cells sealed with adhesive tape for 4 weeks at 71° C., removing the tape, and discharging the cells at room temperature at a constant voltage of 1.1 volts using a variable resistor and measuring the current at 60 seconds. The limiting current was also measured after storing cells sealed with adhesive tape for 28 days in an oxygen atmosphere (about 0.136 to 0.340 atmospheres (2-5 pounds per square inch)) with about 40 to 70 percent relative humidity. The average limiting currents after storage for 7 days at 45° C. and for 28 days in an oxygen atmosphere are shown in Table 1.

The results show that plating the anode cups with a copper-tin-zinc alloy is superior to both no plating and plating with tin, and the combination of plating with a copper-tin-zinc alloy and NGBIA type zinc provides superior sealed cell open circuit voltage and limiting current.

TABLE 1

| Anode Cup | | | SCOCV (volts) | Limiting current (mA) | |
|---|---|---|---|---|---|
| Plating | Zinc Type | Surfactant | 7 days/45° C. | 4 weeks@71° C. | 28 days in $O_2$ |
| none | ZCA 1230 | CARBOWAX ® 550 | 0.99 | 4.80 | 4.20 |
| Sn | ZCA 1230 | CARBOWAX ® 550 | 1.03 | 4.00 | 0.80 |
| Cu—Sn—Zn | ZCA 1230 | CARBOWAX ® 550 | 1.02 | 5.00 | 1.10 |
| Cu—Sn—Zn | NGBIA 115 | DISPERBYK ® D102 | 1.05 | 7.20 | 4.70 |

Example 2

Three lots of hydrogen generating button cells with a diameter of about 11.6 mm and a height of about 5.4 mm were made. The lots were identical except for the cup and the types of zinc and surfactant used in the counter electrode, as shown in Table 2. The process described above was used to plate the cells; for one plated anode cup lot, the cups were passivated using a post-treatment used, and for the other an acid-base passivation was used. The cells in both lots were otherwise like those in Example 1, except the loose layer of PTFE film was replaced with a hydrogen-permeable sintered PTFE material having very low oxygen permeability. Gas generation was substantially lower with both lots with Cu—Sn—Zn plated cups, NGBIA zinc and D102 surfactant.

After the cells were assembled they were aged on adhesive tape for about two weeks before testing. Sample cells from each lot were tested on a gassing test, and the average amount of gas generated, in microliters (μl), is shown in Table 2.

The gassing test method used was:
1. Remove the adhesive tape from the bottom of a cell.
2. Place the cell into a small (e.g., 6.0 cm by 5.5 cm) aluminum foil laminated poly bag, remove most of the air from the bag, and heat seal the bag closed.
3. Place the sealed bag into a glass container and fill the container with oil (e.g., a vacuum oil), completely submersing the bag in oil.
4. Close the glass container with a graduated glass tube (e.g., a graduated pipette) so that no air bubble remains in the container and the oil rises part way up the graduated glass tube; record the level of the oil in the tube.
5. Immerse the closed glass container with graduated glass tube in a water bath at 60° C.
6. Check the level of the oil in the graduated glass tube at 14 days, maintaining the later level in the water bath at a constant level during the test, and record the volume of oil displaced since beginning the test; this is the volume of gas generated during the test.

TABLE 2

| Anode Cup Plating | Zinc Type | Surfactant | Passivation | Gas Generated (μl) |
|---|---|---|---|---|
| none | ZCA 1230 | CARBOWAX ® 550 | | 0.0726 |
| Cu—Sn—Zn | NGBIA 115 | DISPERBYK ® D102 | salt | 0.0128 |
| Cu—Sn—Zn | NGBIA 115 | DISPERBYK ® D102 | acid-base | 0.0014 |

In the embodiments above, the cell is a button type cell; however, other cell sizes and shapes can be used. For example, the cell can be a small prismatic cell, with a generally rectangular or square cross sectional shape having maximum length and width dimensions that allow proper post-plating of the cups using the preferred SBE process. In general, for button and prismatic cells, the maximum cell height is preferably no greater than about 10 mm, more preferably no greater than about 8 mm, and the maximum width dimension (perpendicular to the height) is no more than about 30 mm, more preferably no more than about 20 mm, and even more preferably no more than about 15 mm, and most preferably no more than about 11.6 mm. For larger size cells, with larger cups, other plating processes, such as a rack plating process, can be used for post-plating the cups.

The embodiments described above are hydrogen generating cells. Other types of electrochemical cells with aqueous alkaline electrolytes can be used, such as oxygen generating cells, air depolarized battery cells and even other types of battery cells (e.g., zinc/manganese dioxide and zinc/silver oxide cells), in which one part of the cell housing is in contact with and serves as the current collector for the counter electrode. Other components and materials would be recognized as suitable by those skilled in the art. For example, other active, catalytic, electrically conductive and binding materials can be used in the electrodes, other separator materials can be used, and other additives to the electrodes and electrolytes can be used, based on the requirements and limitations of the electrochemical cell type. In oxygen generating cells and air depolarized battery cells the diffusion layer between the catalytic electrode and the can bottom will be more permeable to air, such as a polytetrafluoroethylene film membrane.

Example 3

Copper-tin-zinc alloy plated anode cups for PR41 size (7.9 mm diameter, 3.6 mm high, zinc-air) button cells were made using the same post-plating process used in Example 1 but with the alloy plating step done at either a single current density or a combination of two different current densities. One batch of approximately 4465 cups (Lot A) was made with an alloy plating current density of 43 amps per square meter (4.0 amps per square foot) for a time corresponding to 14 amp-hours, and another batch of approximately 4465 cups (Lot B) was made with a two stage alloy plating step in which the current density was 43 amps per square meter (4.0 amps per square foot) for a time corresponding to 14 amp-hours, followed by a current density of 8.6 amps per square meter (0.8 amps per square foot) for a time corresponding to 1 amp-hour.

An aqueous KOH solution (33 weight percent KOH) was applied to the external surface of the central portion of samples of cups from Lots A and B. The test was repeated several times. Each time, within 30 minutes about 30 to 100 percent of the cups from Lot A were tarnished in the area to which the KOH solution had been applied, while none of the cups from Lot B were discolored.

Sample cups from Lots A and B were stored at 60° C. and 90 percent relative humidity. After 4 days all of the samples from Lot A were discolored, while none from Lot B were discolored.

Sample cups from Lots A and B were stored at room temperature and ambient humidity for about 6 weeks. Some of the samples from Lot A were discolored in the central portion of the outside of the cups and others were not. None of the samples from Lot B were discolored. The cups are more susceptible to discoloration in the central flat area on the outside of the cups, where the current density was highest during plating and the copper content tends to be highest.

These tests show that cups with a higher copper content in the surface portion of the plated alloy layer are more susceptible to discoloration and that plating the alloy using a variable current density (lower at the end of the alloy plating step) can provide a lower copper content in the surface portion of the alloy layer that is whiter and more resistant to discoloration, while the bulk of the plated alloy layer is plated more quickly, at a higher current density, and still provide an alloy composition that has good resistance to cell internal gassing.

Example 4

Copper-tin-zinc alloy plated cups for AC13 size button cells were manufactured utilizing the same post-plating process utilized in Example 1, with the proviso that the alloy plating step was performed at either a single current density or a combination of different current densities as indicated in Table 4 hereinbelow. The plating was performed on a nickel/stainless steel/copper cup substrate with copper being present on the inside surface of the cup prior to plating. Each lot contained 100 cups. The cups of each lot after plating were assembled into cells and the cells stored at 60 C and 90 percent relative humidity for 50 days. The exposed exterior surfaces of the cups of the cells were visually inspected after the 50 days and the results of the inspection are set forth in Table 4. Undiscolored cups generally maintained a substantially silver-colored appearance, and discolored cups had a substantially black or dark appearance.

TABLE 4

| Lot | Current Density Characteristics of Copper-Zinc-Tin-Alloy Plating | % of Cups Having Discoloration |
|---|---|---|
| 1 | 8.6 A/m² (0.8 ASF) for ~15 Ah | 90 |
| 2 | 16.1 A/m² (1.5 ASF) for ~15 Ah | 70 |
| 3 | 32.3 A/m² (3.0 ASF) for ~15 Ah | 50 |
| 4 | 43 A/m² (4.0 ASF) for ~15 Ah | 40 |
| 5 | 43 A/m² (4.0 ASF) for 14 Ah followed by 8.6 A/m² (0.8 ASF) for ~1 Ah | 0 |

The results set forth in Table 4 show that anode cups plated with a copper-tin-zinc alloy using a dual current density process were significantly more resistant to discoloration than cups plated at a single current density. It is further shown that the dual current density plating profile also outperformed the lots plated at single current densities that were utilized in the dual current density plating process.

Example 5

Three different lots of fifty SR44 type $Zn/Ag_2O$ electrochemical battery cells were produced to determine the external effects with respect to discoloration at a predetermined temperature and relative humidity on the cells. The cells in all three lots had no mercury added (non-amalgamated zinc was used).

The negative electrode casings used in Lots B and C were formed of a triclad material of nickel, stainless steel and copper, with the nickel present on the exterior surface. The negative electrode casings for Lot A were formed from a copper-stainless steel-copper triclad material (stainless steel clad with copper on both surfaces).

The formed negative electrode casing for all three lots were plated with copper, tin and zinc using a barrel plating process. The barrel was a Hardwood barrel 25.4 cm (10 inches) in diameter and 43.2 cm (17 inches) high with a perforated, non-pocketed design and a vertically striated interior surface (Hardwood Line Manufacturing Co.). The batch size was approximately 10,000 casings. The process steps were similar to those in the spouted bed electrode process described above, except there was no post-plating passivation step: clean for 5 minutes with N-36 alkaline cleaner (Benchmark Products, Inc.), rinse 4 times for 0.2 minutes each with deionized water, activate for 2 minutes with 10 percent sulfuric acid, rinse 4 times for 0.2 minutes each with deionized water, plated with copper, tin and zinc using Bronzex® WJ-SP (a white bronze process with fully organic additive, from Enthone, Inc.), rinse 4 times for 0.2 minutes each with deionized water, rinse for 0.5 minute with deionized water, and dry.

Lots A and C were plated with copper, tin and zinc utilizing two different current densities, namely a first current density of 43 amps per square meter (4 amps per square foot) for 39.9 ampere-hours (Ah) and a second current density of 16.1 amps per square meter (1.5 amps per square foot) for 8.52 Ah. Lot C was plated with copper, tin and zinc at a current density of 43 amps per square meter (4 amps per square foot) for 62.6 Ah.

Cells from each lot were stored at 60° C. and at 90% relative humidity. A visual observation of the exposed negative electrode casing surface was performed initially and thereafter at one week intervals with respect to discoloration. The results are set forth in Table 5.

TABLE 5

| Lot # Substrate | Initial | Week 1 | Week 2 | Week 3 | Week 4 | Week 5 | Week 7 |
|---|---|---|---|---|---|---|---|
| A Cu/SS/Cu | 0 | 0 | 1 | 2 | 2 | 3 | 5 |
| B Ni/SS/Cu | 0 | 3 | 7 | 9 | 15 | 17 | 20 |
| C Ni/SS/Cu | 0 | 1 | 1 | 4 | 5 | 7 | 8 |

The results set forth in Table 5 indicate that the exposed surface of the negative electrode casing including a copper, tin and zinc alloy plated over a substrate having a copper layer in contact with the plating is more resistant to discoloration when compared to a cell having a negative electrode casing with a copper-tin-zinc alloy over a substrate having a nickel exterior surface.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. An electrochemical cell, comprising:
   a first and a second electrode;
   a separator disposed between the first electrode and the second electrode;
   an aqueous alkaline electrolyte; and
   a cell housing comprising a first electrode housing and a second electrode housing and an electrically insulating seal member disposed between the first electrode housing and second electrode housing, the cell housing containing the first electrode, second electrode, separator and electrolyte, wherein
   the first electrode housing is in contact with the first electrode and has an interior surface and an exterior surface and comprises a substrate plated with an alloy layer, wherein the alloy layer comprises copper, tin and zinc, and wherein the substrate is a copper-stainless steel-copper triclad substrate;
   the interior surface and the exterior surface of the first electrode housing substrate are post-plated with the plated alloy layer; and
   a surface portion of the plated alloy layer has a lower copper content than a portion of the plated alloy layer contacting the substrate.

2. The electrochemical cell according to claim 1, wherein the first electrode is a negative electrode comprising zinc and the second electrode is a positive electrode comprising at least one of manganese dioxide, a silver oxide and a catalytic material for reducing oxygen or for generating hydrogen or oxygen.

3. The electrochemical cell according to claim 2, wherein the first electrode is a gelled electrode comprising a gelling agent and zinc, and the second electrode is a catalytic electrode comprising carbon, a binder, and manganese oxide.

4. The electrochemical cell according to claim 2, wherein the second electrode comprises a silver oxide.

5. The electrochemical cell according to claim 1, wherein the cell is a button cell.

6. The electrochemical cell according to claim 5, wherein the first electrode is free of added mercury.

7. The electrochemical cell according to claim 1, wherein the cell is a hydrogen generating cell and the second electrode casing includes at least one aperture, and wherein the second electrode is a catalytic electrode that includes at least one layer for excluding oxygen from the cell located between the aperture and the catalytic electrode.

8. The electrochemical cell according to claim 1, wherein the portion of the plated alloy layer contacting the substrate has a thickness greater than a thickness of the surface portion of the plated alloy layer.

9. The electrochemical cell according to claim 8, wherein the portion of the plated alloy layer contacting the substrate has a ratio of copper from 50 to 70 weight percent, tin from 26 to 42 weight percent, and zinc from 3 to 9 weight percent measured at a central portion of the exterior surface of the first electrode casing by SEM/EDS, and wherein the surface portion of the plated alloy layer has a ratio of copper from 36 to 46 weight percent, tin from 42 to 57 weight percent and zinc from 6.5 to 9.5 weight percent measured at a central portion of the exterior surface of the first electrode casing by SEM/EDS.

10. An electrochemical cell, comprising:
    a first and a second electrode;
    a separator disposed between the first electrode and the second electrode;
    an aqueous alkaline electrolyte; and
    a cell housing comprising a first electrode housing and a second electrode housing and an electrically insulating seal member disposed between the first electrode housing and second electrode housing, the cell housing containing the first electrode, second electrode, separator and electrolyte, wherein
    the first electrode housing is in contact with the first electrode and has an interior surface and an exterior surface and comprises a substrate plated with an alloy layer, wherein the alloy layer comprises copper, tin and zinc, and wherein the substrate is a clad material including a copper layer clad to each side of a layer of metal;
    the interior surface and the exterior surface of the first electrode housing substrate are post-plated with the plated ally layer; and
    a surface portion of the plated alloy layer has a lower copper content than a portion of the plated alloy layer contacting the substrate.

11. The electrochemical cell according to claim 10, wherein the layer of metal of the first electrode housing comprises steel.

12. The electrochemical cell according to claim 11, wherein the first electrode housing substrate is a copper-stainless steel-copper triclad substrate.

13. The electrochemical cell according to claim 11, wherein the cell is a button cell.

14. The electrochemical cell according to claim 13, wherein the first electrode is free of added mercury.

15. The electrochemical cell according to claim 10, wherein the first electrode is a negative electrode comprising zinc and the second electrode is a positive electrode comprising at least one of manganese dioxide, a silver oxide and a catalytic material for reducing oxygen or for generating hydrogen or oxygen.

16. The electrochemical cell according to claim 15, wherein the second electrode comprises a silver oxide.

17. The electrochemical cell according to claim 10, wherein the first electrode is a gelled electrode comprising a gelling agent and zinc, and the second electrode is a catalytic electrode comprising carbon, a binder, and manganese oxide.

18. The electrochemical cell according to claim 10, wherein the cell is a hydrogen generating cell and the second electrode casing includes at least one aperture, and wherein the second electrode is a catalytic electrode that includes at least one layer for excluding oxygen from the cell located between the aperture and the catalytic electrode.

19. The electrochemical cell according to claim 10, wherein the portion of the plated alloy layer contacting the substrate has a thickness greater than a thickness of the surface portion of the plated alloy layer.

20. The electrochemical cell according to claim 19, wherein the portion of the plated alloy layer contacting the substrate has a ratio of copper from 50 to 70 weight percent, tin from 26 to 42 weight percent, and zinc from 3 to 9 weight percent measured at a central portion of the exterior surface of the first electrode casing by SEM/EDS, and wherein the surface portion of the plated alloy layer has a ratio of copper from 36 to 46 weight percent, tin from 42 to 57 weight percent and zinc from 6.5 to 9.5 weight percent measured at a central portion of the exterior surface of the first electrode casing by SEM/EDS.

* * * * *